US009942519B1

(12) United States Patent
Pan et al.

(10) Patent No.: US 9,942,519 B1
(45) Date of Patent: Apr. 10, 2018

(54) TECHNOLOGIES FOR FOLLOWING PARTICIPANTS IN A VIDEO CONFERENCE

(71) Applicant: CISCO TECHNOLOGY, INC., San Jose, CA (US)

(72) Inventors: Grant Pan, Hefei (CN); Mingfeng Yang, Hefei (CN); Jason Ding, Hefei (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/438,105

(22) Filed: Feb. 21, 2017

(51) Int. Cl.
  *H04N 7/15* (2006.01)
  *G06F 3/0484* (2013.01)
  *H04L 29/06* (2006.01)
  *H04N 5/445* (2011.01)

(52) U.S. Cl.
  CPC ......... *H04N 7/157* (2013.01); *G06F 3/04845* (2013.01); *H04L 65/1093* (2013.01); *H04N 5/44591* (2013.01)

(58) Field of Classification Search
  None
  See application file for complete search history.

(56) References Cited

U.S. PATENT DOCUMENTS

| 4,460,807 A | 7/1984 | Kerr et al. |
| 4,890,257 A | 12/1989 | Anthias et al. |
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |

(Continued)

FOREIGN PATENT DOCUMENTS

| CN | 101055561 | 10/2007 |
| CN | 102572370 | 7/2012 |

(Continued)

OTHER PUBLICATIONS

Author Unknown, "A Primer on the H.323 Series Standard," Version 2.0, available at http://www.packetizer.com/voip/h323/papers/primer/, retrieved on Dec. 20, 2006, 17 pages.

(Continued)

*Primary Examiner* — Creighton Smith
(74) *Attorney, Agent, or Firm* — Polsinelli PC

(57) ABSTRACT

Systems, methods, and computer-readable storage media for enabling participant following in an electronic conference. An example method can involve generating a graphical interface for an electronic conference including a group of participants, the graphical interface displaying an active participant in a first display region and a panel of respective graphical participant representations in a second display region. The method can further involve receiving, via the graphical interface, an input requesting to move at least one of the respective graphical participant representations out of the panel in the second display region to a location in the first display region of the graphical interface, and based on the input, updating the graphical interface to display the at least one of the respective graphical participant representations in the first display region.

26 Claims, 15 Drawing Sheets

(56) References Cited

U.S. PATENT DOCUMENTS

| | | | |
|---|---|---|---|
| 5,995,096 | A | 11/1999 | Kitahara et al. |
| 6,040,817 | A | 3/2000 | Sumikawa |
| 6,075,531 | A | 6/2000 | Destefano |
| 6,191,807 | B1 | 2/2001 | Hamada et al. |
| 6,300,951 | B1 | 10/2001 | Filetto et al. |
| 6,392,674 | B1 | 5/2002 | Hiraki et al. |
| 6,554,433 | B1 | 4/2003 | Holler |
| 6,573,913 | B1 | 6/2003 | Butler et al. |
| 6,646,997 | B1 | 11/2003 | Baxley et al. |
| 6,754,321 | B1 | 6/2004 | Innes et al. |
| RE38,609 | E | 10/2004 | Chen et al. |
| 7,062,532 | B1 | 6/2006 | Sweat et al. |
| 7,124,164 | B1 | 10/2006 | Chemtob |
| 7,418,664 | B2 | 8/2008 | Ben-Shachar et al. |
| 7,441,198 | B2 | 10/2008 | Dempski et al. |
| 7,478,339 | B2 | 1/2009 | Pettiross et al. |
| 7,530,022 | B2 | 5/2009 | Ben-Shachar et al. |
| 7,620,902 | B2 | 11/2009 | Manion et al. |
| 7,634,533 | B2 | 12/2009 | Rudolph et al. |
| 7,881,450 | B1 | 2/2011 | Gentle et al. |
| 7,920,160 | B2 | 4/2011 | Tamaru et al. |
| 7,956,869 | B1 | 6/2011 | Gilra |
| 8,290,998 | B2 | 10/2012 | Stienhans et al. |
| 8,340,268 | B2 | 12/2012 | Knaz |
| 8,358,327 | B2 | 1/2013 | Duddy |
| 8,428,234 | B2 | 4/2013 | Knaz |
| 8,434,019 | B2 | 4/2013 | Nelson |
| 8,456,507 | B1 | 6/2013 | Mallappa et al. |
| 8,462,103 | B1 | 6/2013 | Moscovitch et al. |
| 8,478,848 | B2 | 7/2013 | Minert |
| 8,630,208 | B1 | 1/2014 | Kjeldaas |
| 8,638,354 | B2 | 1/2014 | Leow et al. |
| 8,675,847 | B2 | 3/2014 | Shaffer et al. |
| 8,694,587 | B2 | 4/2014 | Chaturvedi et al. |
| 8,694,593 | B1 | 4/2014 | Wren et al. |
| 8,831,505 | B1 | 9/2014 | Seshadri |
| 8,890,924 | B2 | 11/2014 | Wu |
| 8,892,646 | B2 | 11/2014 | Chaturvedi et al. |
| 8,924,862 | B1 | 12/2014 | Luo |
| 8,930,840 | B1 | 1/2015 | Riskó et al. |
| 9,031,839 | B2 | 5/2015 | Thorsen et al. |
| 9,032,028 | B2 | 5/2015 | Davidson et al. |
| 9,143,729 | B2 | 9/2015 | Anand et al. |
| 9,197,701 | B1 | 11/2015 | Petrov et al. |
| 9,197,848 | B2 | 11/2015 | Felkai et al. |
| 9,201,527 | B2 | 12/2015 | Kripalani et al. |
| 9,204,099 | B2 | 12/2015 | Brown |
| 9,268,398 | B2 | 2/2016 | Tipirneni |
| 9,298,342 | B2 | 3/2016 | Zhang et al. |
| 9,323,417 | B2 | 4/2016 | Sun et al. |
| 9,335,892 | B2 | 5/2016 | Ubillos |
| 9,349,119 | B2 | 5/2016 | Desai et al. |
| 9,367,224 | B2 | 6/2016 | Ananthakrishnan et al. |
| 9,432,512 | B2 | 8/2016 | You |
| 9,449,303 | B2 | 9/2016 | Underhill et al. |
| 9,495,664 | B2 | 11/2016 | Cole et al. |
| 9,516,022 | B2 | 12/2016 | Borzycki et al. |
| 9,525,711 | B2 | 12/2016 | Ackerman et al. |
| 9,563,480 | B2 | 2/2017 | Messerli et al. |
| 9,609,030 | B2 | 3/2017 | Sun et al. |
| 9,667,799 | B2 | 5/2017 | Olivier et al. |
| 2002/0076003 | A1 | 6/2002 | Zellner et al. |
| 2002/0078153 | A1 | 6/2002 | Chung et al. |
| 2003/0028647 | A1 | 2/2003 | Grosu |
| 2003/0046421 | A1 | 3/2003 | Horvitz et al. |
| 2003/0174826 | A1 | 9/2003 | Hesse |
| 2003/0197739 | A1 | 10/2003 | Bauer |
| 2003/0227423 | A1 | 12/2003 | Arai et al. |
| 2004/0098456 | A1 | 5/2004 | Krzyzanowski et al. |
| 2004/0210637 | A1 | 10/2004 | Loveland |
| 2004/0267938 | A1 | 12/2004 | Shoroff, Sr. et al. |
| 2005/0014490 | A1 | 1/2005 | Desai et al. |
| 2005/0055405 | A1 | 3/2005 | Kaminsky et al. |
| 2005/0055412 | A1 | 3/2005 | Kaminsky et al. |
| 2005/0085243 | A1 | 4/2005 | Boyer et al. |
| 2005/0099492 | A1* | 5/2005 | Orr ................. H04L 12/1827 348/14.08 |
| 2005/0108328 | A1 | 5/2005 | Berkeland et al. |
| 2006/0004911 | A1 | 1/2006 | Becker et al. |
| 2006/0026255 | A1 | 2/2006 | Malamud et al. |
| 2006/0164552 | A1 | 7/2006 | Cutler |
| 2006/0250987 | A1 | 11/2006 | White et al. |
| 2007/0005752 | A1 | 1/2007 | Chawla et al. |
| 2007/0041366 | A1 | 2/2007 | Vugenfirer et al. |
| 2007/0091831 | A1 | 4/2007 | Croy et al. |
| 2007/0100986 | A1 | 5/2007 | Bagley et al. |
| 2007/0116225 | A1 | 5/2007 | Zhao et al. |
| 2007/0139626 | A1 | 6/2007 | Saleh et al. |
| 2007/0250567 | A1 | 10/2007 | Graham et al. |
| 2008/0068447 | A1 | 3/2008 | Mattila et al. |
| 2008/0080532 | A1 | 4/2008 | O'Sullivan et al. |
| 2009/0012963 | A1 | 1/2009 | Johnson et al. |
| 2009/0100142 | A1 | 4/2009 | Stern et al. |
| 2009/0193327 | A1 | 7/2009 | Roychoudhuri et al. |
| 2009/0254619 | A1 | 10/2009 | Kho et al. |
| 2009/0256901 | A1* | 10/2009 | Mauchly ................. H04N 5/45 348/14.07 |
| 2009/0292999 | A1 | 11/2009 | LaBine et al. |
| 2009/0309846 | A1 | 12/2009 | Trachtenberg et al. |
| 2010/0005142 | A1 | 1/2010 | Xiao et al. |
| 2010/0061538 | A1 | 3/2010 | Coleman et al. |
| 2010/0070640 | A1 | 3/2010 | Allen, Jr. et al. |
| 2010/0073454 | A1 | 3/2010 | Lovhaugen et al. |
| 2010/0094867 | A1 | 4/2010 | Badros et al. |
| 2010/0157978 | A1 | 6/2010 | Robbins et al. |
| 2010/0211872 | A1 | 8/2010 | Rolston et al. |
| 2010/0245535 | A1 | 9/2010 | Mauchly |
| 2010/0262925 | A1 | 10/2010 | Liu et al. |
| 2010/0303227 | A1 | 12/2010 | Gupta |
| 2010/0316207 | A1 | 12/2010 | Brunson |
| 2011/0075830 | A1 | 3/2011 | Dreher et al. |
| 2011/0131498 | A1 | 6/2011 | Chao et al. |
| 2011/0264928 | A1 | 10/2011 | Hinckley |
| 2011/0270609 | A1 | 11/2011 | Jones et al. |
| 2011/0271211 | A1 | 11/2011 | Jones et al. |
| 2011/0283226 | A1 | 11/2011 | Basson et al. |
| 2012/0013704 | A1 | 1/2012 | Sawayanagi et al. |
| 2012/0084714 | A1 | 4/2012 | Sirpal et al. |
| 2012/0190386 | A1 | 7/2012 | Anderson |
| 2012/0246229 | A1 | 9/2012 | Carr et al. |
| 2012/0246596 | A1 | 9/2012 | Ording et al. |
| 2012/0284635 | A1 | 11/2012 | Sitrick et al. |
| 2012/0296957 | A1 | 11/2012 | Stinson et al. |
| 2012/0306993 | A1 | 12/2012 | Sellers-Blais |
| 2013/0038675 | A1 | 2/2013 | Malik |
| 2013/0047093 | A1 | 2/2013 | Reuschel et al. |
| 2013/0050398 | A1 | 2/2013 | Krans et al. |
| 2013/0063542 | A1 | 3/2013 | Bhat et al. |
| 2013/0090065 | A1 | 4/2013 | Fisunenko et al. |
| 2013/0091205 | A1 | 4/2013 | Kotler et al. |
| 2013/0091440 | A1 | 4/2013 | Kotler et al. |
| 2013/0135837 | A1 | 5/2013 | Kemppinen |
| 2013/0141371 | A1 | 6/2013 | Hallford et al. |
| 2013/0185672 | A1 | 7/2013 | McCormick et al. |
| 2013/0198629 | A1 | 8/2013 | Tandon et al. |
| 2013/0215215 | A1 | 8/2013 | Gage et al. |
| 2013/0219278 | A1 | 8/2013 | Rosenberg |
| 2013/0222246 | A1 | 8/2013 | Booms et al. |
| 2013/0227433 | A1 | 8/2013 | Doray et al. |
| 2013/0290421 | A1 | 10/2013 | Benson et al. |
| 2013/0300637 | A1 | 11/2013 | Smits et al. |
| 2013/0329865 | A1 | 12/2013 | Ristock et al. |
| 2013/0335507 | A1 | 12/2013 | Aarrestad et al. |
| 2014/0012990 | A1 | 1/2014 | Ko |
| 2014/0028781 | A1 | 1/2014 | MacDonald |
| 2014/0040819 | A1 | 2/2014 | Duffy |
| 2014/0068452 | A1 | 3/2014 | Joseph et al. |
| 2014/0078182 | A1 | 3/2014 | Utsunomiya |
| 2014/0157338 | A1 | 6/2014 | Pearce |
| 2014/0161243 | A1 | 6/2014 | Contreras et al. |
| 2014/0198175 | A1 | 7/2014 | Shaffer et al. |
| 2014/0237371 | A1 | 8/2014 | Klemm et al. |
| 2014/0280595 | A1 | 9/2014 | Mani et al. |
| 2014/0282213 | A1 | 9/2014 | Musa et al. |

(56) References Cited

U.S. PATENT DOCUMENTS

| | | | |
|---|---|---|---|
| 2014/0317561 A1 | 10/2014 | Robinson et al. | |
| 2014/0372908 A1 | 12/2014 | Kashi et al. | |
| 2015/0004571 A1 | 1/2015 | Ironside et al. | |
| 2015/0009278 A1 | 1/2015 | Modai et al. | |
| 2015/0029301 A1 | 1/2015 | Nakatomi et al. | |
| 2015/0067552 A1 | 3/2015 | Leorin et al. | |
| 2015/0081885 A1 | 3/2015 | Thomas et al. | |
| 2015/0085060 A1 | 3/2015 | Fish et al. | |
| 2015/0089393 A1 | 3/2015 | Zhang et al. | |
| 2015/0089394 A1 | 3/2015 | Chen et al. | |
| 2015/0113050 A1 | 4/2015 | Stahl | |
| 2015/0172120 A1 | 6/2015 | Dwarampudi et al. | |
| 2015/0304366 A1 | 10/2015 | Bader-Natal et al. | |
| 2015/0319113 A1* | 11/2015 | Gunderson | H04M 1/72552 715/753 |
| 2015/0373063 A1 | 12/2015 | Vashishtha et al. | |
| 2016/0050079 A1 | 2/2016 | Martin De Nicolas et al. | |
| 2016/0050175 A1 | 2/2016 | Chaudhry et al. | |
| 2016/0072862 A1 | 3/2016 | Bader-Natal et al. | |
| 2016/0094593 A1 | 3/2016 | Priya | |
| 2016/0110056 A1* | 4/2016 | Hong | G06F 3/04812 715/768 |
| 2016/0173537 A1 | 6/2016 | Kumar et al. | |
| 2016/0182580 A1 | 6/2016 | Nayak | |
| 2016/0277461 A1 | 9/2016 | Sun et al. | |
| 2016/0309037 A1 | 10/2016 | Rosenberg et al. | |
| 2017/0006446 A1 | 1/2017 | Harris et al. | |
| 2017/0070706 A1 | 3/2017 | Ursin et al. | |
| 2017/0104961 A1 | 4/2017 | Pan et al. | |

FOREIGN PATENT DOCUMENTS

| | | |
|---|---|---|
| CN | 102655583 | 9/2012 |
| CN | 102938834 | 2/2013 |
| CN | 103141086 | 6/2013 |
| CN | 204331453 | 5/2015 |
| EP | 959585 | 11/1999 |
| WO | WO 2012/167262 | 12/2012 |
| WO | WO 2014/118736 | 8/2014 |

OTHER PUBLICATIONS

Author Unknown, "Active screen follows mouse and dual monitors," KDE Community Forums, Apr. 13, 2010, 3 pages.

Author Unknown, "Implementing Media Gateway Control Protocols" A RADVision White Paper, Jan. 27, 2002, 16 pages.

Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).

Cisco Systems, Inc., "Cisco WebEx Meetings Server System Requirements release 1.5." 30 pages, Aug. 14, 2013.

Cisco White Paper, "Web Conferencing: Unleash the Power of Secure, Real-Time Collaboration," pp. 1-8, 2014.

Clarke, Brant, "Polycom Announces RealPresence Group Series," "Polycom Announces RealPresence Group Series" dated Oct. 8, 2012 available at http://www.323.tv/news/polycom-realpresence-group-series (last accessed Oct. 11, 2013).

Clauser, Grant, et al., "Is the Google Home the voice-controlled speaker for you?," The Wire Cutter, Nov. 22, 2016, pp. 1-15.

Cole, Camille, et al., "Videoconferencing for K-12 Classrooms," Second Edition (excerpt), http://www.iste.org/docs/excerpts/VIDCO2-excerpt/pdf (last accessed 1011-2013), 2009.

Epson, "BrightLink Pro Projector," BrightLink Pro Projector. http://www.epson.com/cgi-bin/Store/lsp/Landing/brightlink-pro-interactive-projectors.do?ref=van brightlink-pro—dated 2013 (last accessed 10-112013).

Infocus, "Mondopad," Mondopad. http://www.infocus.com/sites/default/files/InFocus-Mondopad-INF5520a-INF7021-Datasheet-EN.pdf (last accessed Oct. 11, 2013), 2013.

MacCormick, John, "Video Chat with Multiple Cameras," CSCW '13, Proceedings of the 2013 conference on Computer supported cooperative work companion, pp. 195-198, ACM, New York, NY, USA, 2013.

Microsoft, "Positioning Objects on Multiple Display Monitors," Aug. 12, 2012, 2 pages.

Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).

Nu-Star Technologies, "Interactive Whiteboard Conferencing," Interactive Whiteboard Conferencing. http://www.nu-star.com/interactive-conf.php dated 2013 (last accessed Oct. 11, 2013).

Polycom, "Polycom RealPresence Mobile: Mobile Telepresence & Video Conferencing," http://www.polycom.com/products-services/hd-telepresence-video-conferencing/realpresence-mobile. html#stab1 (last accessed Oct. 11, 2013), 2013.

Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.

Polycom, "Polycom UC Board, Transforming ordinary surfaces into virtual whiteboards" 2012, Polycom, Inc., San Jose, CA, http://www.uatg.com/pdf/polycom/polycom-uc-board- datasheet.pdf, (last accessed Oct. 11, 2013).

Stodle. Daniel, et al., "Gesture-Based, Touch-Free Multi-User Gaming on Wall-Sized, High-Resolution Tiled Displays," 2008, 13 pages.

Thompson, Phil, et al., "Agent Based Ontology Driven Virtual Meeting Assistant," Future Generation Information Technology, Springer Berlin Heidelberg, 2010, 4 pages.

TNO, "Multi-Touch Interaction Overview," Dec. 1, 2009, 12 pages.

Toga, James, et al., "Demystifying Multimedia Conferencing Over the Internet Using the H.323 Set of Standards," Intel Technology Journal Q2, 1998, 11 pages.

Ubuntu, "Force Unity to open new window on the screen where the cursor is?" Sep. 16, 2013, 1 page.

VB Forums, "Pointapi," Aug. 8, 2001, 3 pages.

Vidyo, "VidyoPanorama," VidyoPanorama—http://www.vidyo.com/products/vidyopanorama/ dated 2013 (last accessed Oct. 11, 2013).

* cited by examiner

TECHNOLOGIES FOR FOLLOWING PARTICIPANTS IN A VIDEO CONFERENCE

TECHNICAL FIELD

The present technology pertains to conferencing systems, and more specifically, the present technology involves systems for enabling conference participants to follow participants of interest in a conference and maintaining customized conference state across different devices and conference sessions.

BACKGROUND

Network-based conferencing services can greatly simplify communications and enhance productivity across the globe. For example, electronic conferencing systems enable users to interact with each other from almost anywhere in the world. Users can engage in voice, video, and instant messaging communications from different locations, and share content with other participants in the electronic conference. Conferencing systems allow users to create virtual meetings for an electronic conference, which can often resemble in-person meetings, where users meet in a physical conference location and interact with each other.

Improvements in conferencing capabilities have enabled conferencing solutions to support increasingly large numbers of participants. Indeed, a single network or cloud-based conference can often involve numerous participants—many of which may be situated in different locations. While the evolving conferencing capabilities have enabled users to connect in larger numbers, it has also created new challenges for conferencing. For example, with larger numbers of participants, virtual meetings can quickly become difficult to manage or operate. Information and communications can be difficult to track and participants can often be visually overwhelmed. Many of the advantages of virtual meetings, such as the ability to view and interact with users over the Internet, are significantly hindered as virtual meetings grow and become increasingly saturated with information and interactions.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
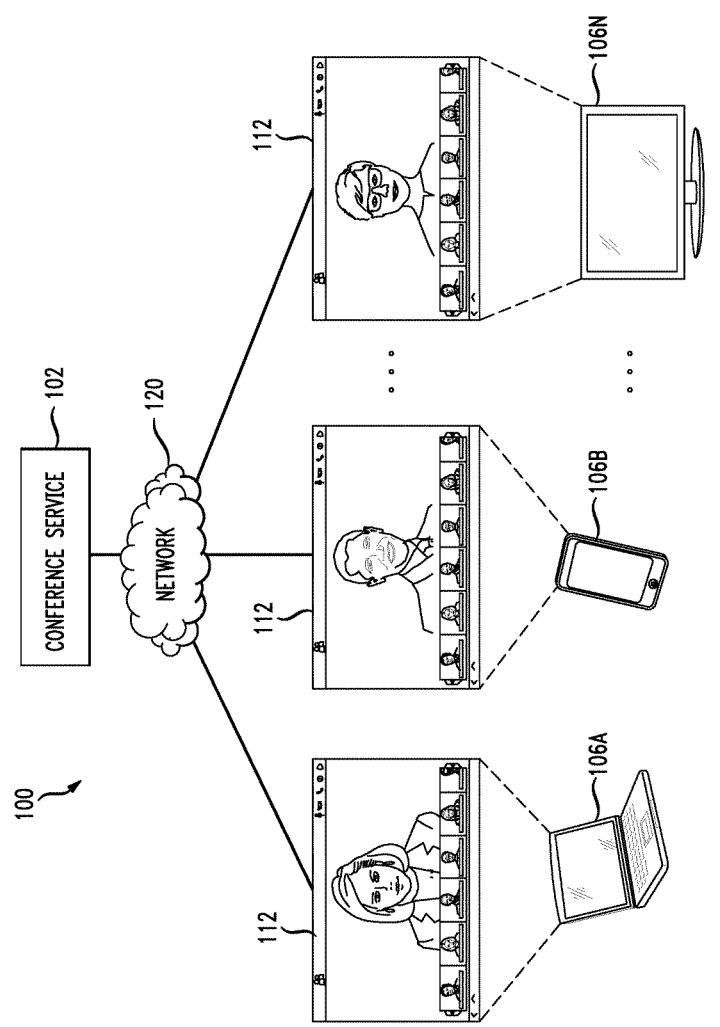
FIG. 1 illustrates an example conference environment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

OVERVIEW

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can enable participants in a multi-participant conference to follow selected participants from the conference, and maintain conference settings across different devices and sessions. A virtual conference can enable participants to conduct video, voice, and text interactions, and obtain live video of the various participants. Participants can access a virtual rendering of the conference, which present video or image feeds from the various participants in the conference. To improve the user experience, video or image feeds from other participants are often arranged in a particular display region or format, such as a panel of thumbnails containing video feeds.

Unfortunately, in larger conferences, it may be difficult or impossible to concurrently display the video or image feeds of every participant. For example, a panel of video feeds in the conference may have size limitations which prevent the panel to concurrently display the video feeds from every participant in a conference. Thus, the panel may only concurrently present a subset of available video feeds, while excluding one or more video feeds. In some cases, a panel of video feeds can enable scrolling or stacking of video feeds to allow a user to access any of video feeds excluded from view. However, the scrolling or stacking of video feeds can become cumbersome, particularly as the number of participants in the conference increases. The approaches herein allow a user to follow a participant of interest to retain a persistent view of that participant's video feed and avoid having to scroll or re-arrange the panel of video feeds to view that participant's video feed. For example, if a user wishes to follow a participant, the user may move the respective video feed of the participant to a persistent location within the user's conference view, so the respective video feed remains within the persistent location even as the user scrolls or navigates through the panel. The user may also retain the state of a conference view across devices and sessions. The conferencing system can thus maintain personalized conference views and settings for users across devices and sessions.

Disclosed are systems, methods, and computer-readable storage media for enabling participants in a multi-participant conference to follow other participants. In some embodiments, an example method can involve generating a graphical interface for an electronic conference including a group of participants. The graphical interface can display an active participant in a first display region and a panel of participants in a second display region. The panel of participants can concurrently display respective graphical representations corresponding to a subset of the group of participants in the electronic conference. The number of participants in the subset of the group of participants can be based a size restriction of the panel and/or display. For example, the size restriction can be based on a size of the conference display or a width of the panel. To illustrate, the width of the panel may not be sufficient to concurrently fit the video feeds of every participant.

The method can also involve receiving, via the graphical interface, an input requesting to move one or more of the respective graphical representations out of the panel in the second display region to a location in the first display region of the graphical interface, and based on the input, updating the graphical interface to display the one or more of the respective graphical representations in the first display region. This can allow the user to follow participants associated with the one or more of the respective graphical representations, by moving the one or more of the respective graphical representations outside of the panel, to the location in the first display region. The location can be a persistent location, which ensures that the one or more of the respective graphical representations remain displayed in the persistent location permanently or until a specific triggering event, such as a user request to remove the one or more of the graphical representations from the persistent location.

DESCRIPTION

Figure 6:
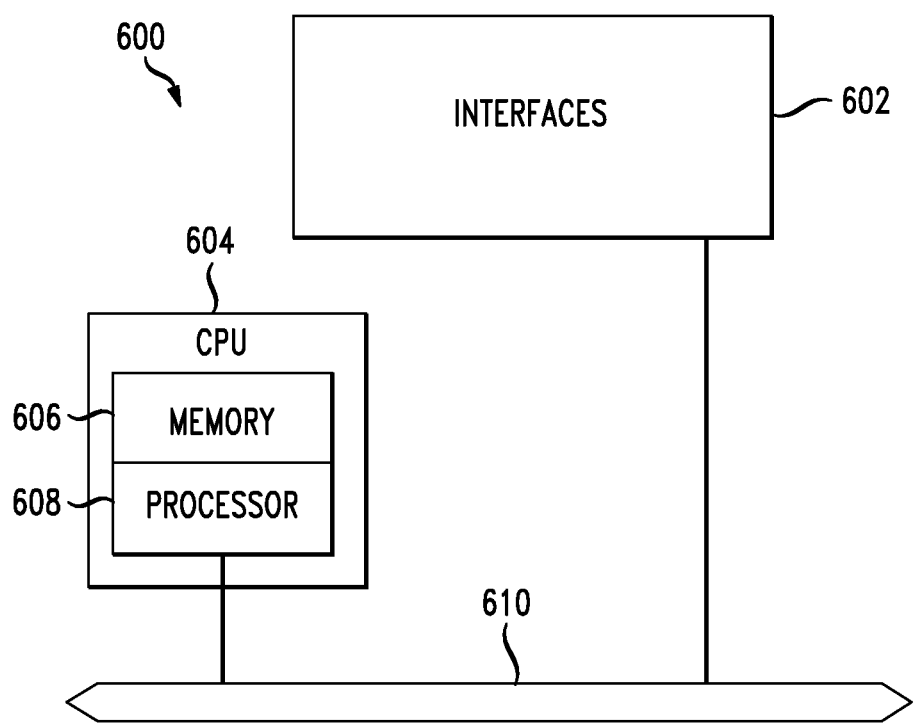
FIG. 6 illustrates an example network device.
Figure 7A:
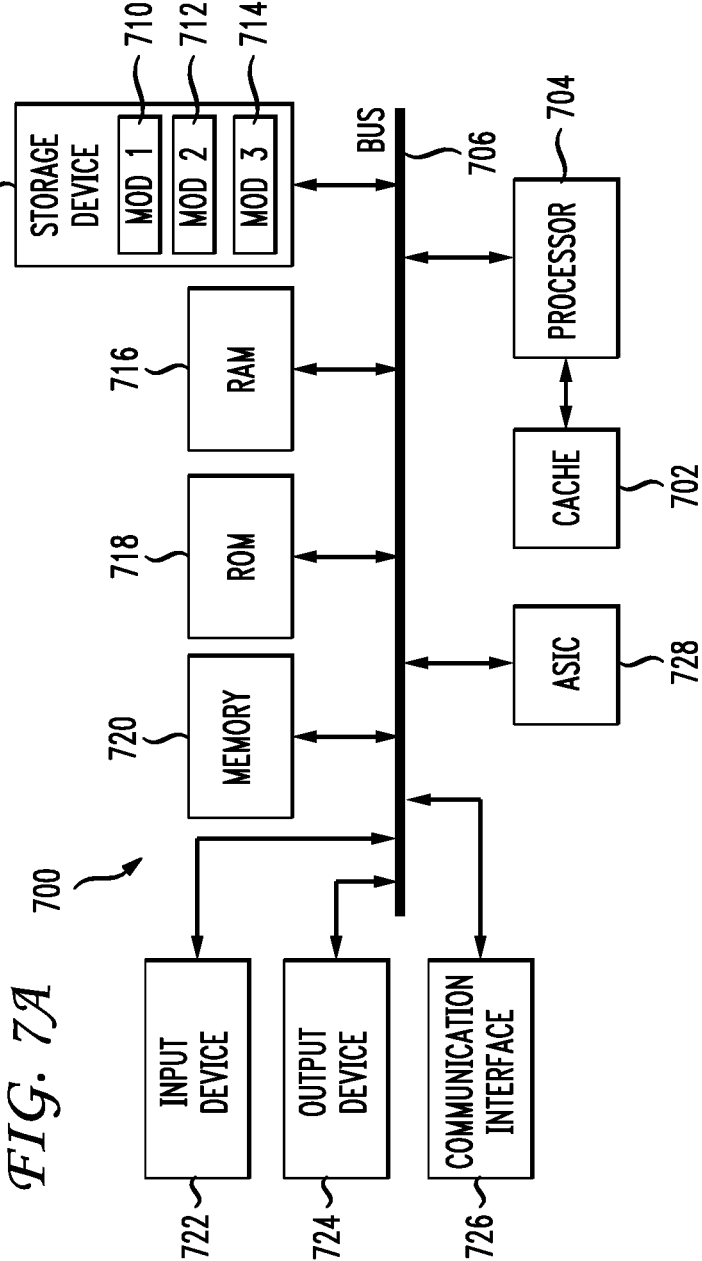
FIGS. 7A-B illustrate example computing devices.
Figure 7B:
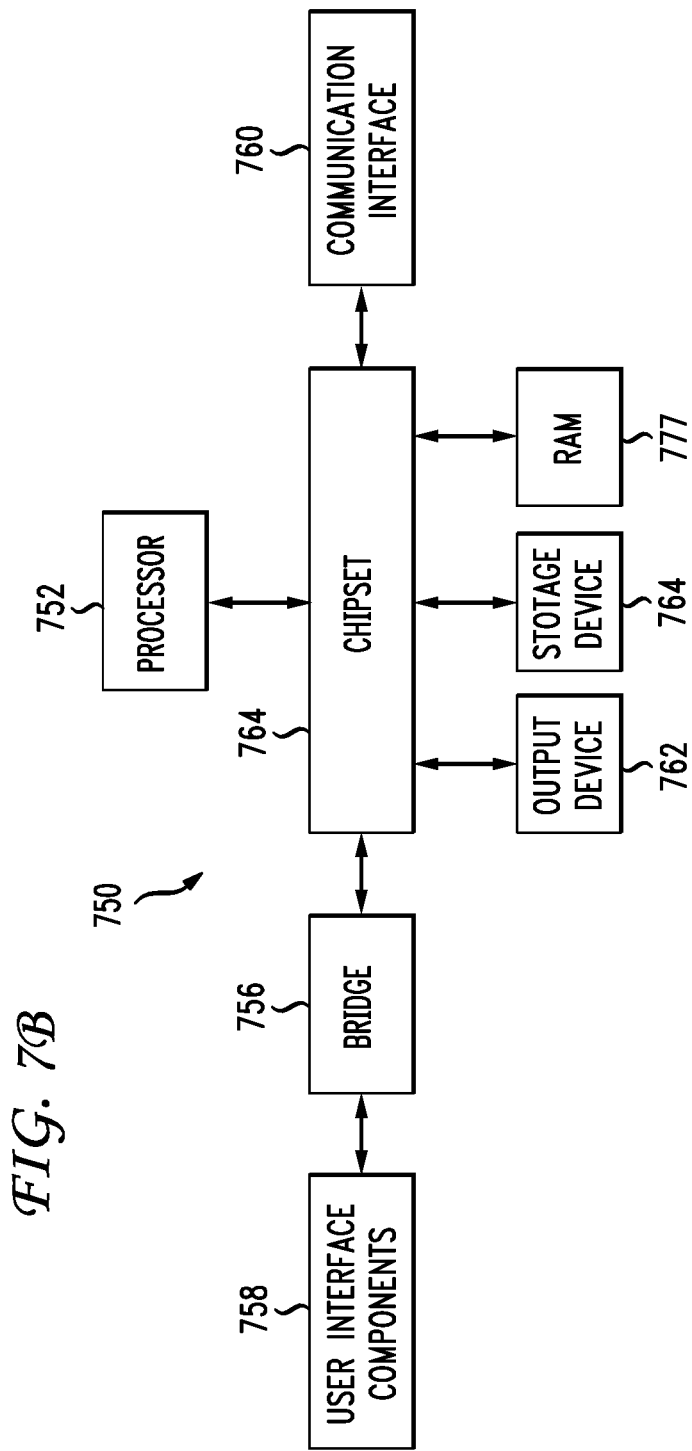

The disclosed technology addresses the need in the art for improved conferencing systems and interfaces. The present technology involves system, methods, and computer-readable media for enabling participants in a multi-participant conference to follow other participants and retain a customized custom state across devices or sessions. A description of example architectures and configurations for conferencing environments, as illustrated in FIG. 1, is first disclosed herein. A description of example conferencing interfaces, as illustrated in FIGS. 2-5, will then follow. The discussion then concludes with a brief description of example computing devices, as illustrated in FIGS. 6 and 7A-B. These variations shall be described herein as the various embodiments are set forth. The disclosure now turns to FIG. 1.

FIG. 1 illustrates a diagram of an example conference environment 100. The conference environment 100 can include a conference service 102 configured to host conferences between participants connected via respective endpoints 106A, 106B, 106N (collectively "106" hereinafter). The conferences can include web conferences, video conference, telepresence, and any other type of electronic communication session. A conference can include video, voice, voice messaging, content sharing, instant messaging, desktop or screen sharing, chat, presence sharing, and/or other types of media and communications. Moreover, a conference can include real-time or live and/or recorded content and communications.

Conferences can be hosted and managed by the conference service 102. The conference service 102 can manage various aspects of the conferences, such as content, communications, data, state, settings, functionality, routing, bridging, etc. The conference service 102 can host concurrent conferences, persistent conferences, and other so forth. The conference service 102 can host numerous conferences at any time or period (e.g., an hour, a day, a week, a month, etc.). The number and/or type of participants in a conference can vary and may change dynamically. For example, the number of participants in a conference can change during the conference, as participants may dynamically join or leave the conference.

The conference service 102 can include one or more servers, bridges, server applications, cloud services, routers, conference bridges, gateways, multipoint control units, conference applications, etc. Moreover, the infrastructure of the conference service 102 can vary in different deployments. For example, the conference service 102 can be deployed via an on-premises conferencing infrastructure for an organization or enterprise, as a cloud-based service hosted on one or more cloud computing environments or data centers, in a hybrid infrastructure including an on-premises conferencing infrastructure and cloud-based service, etc. In some cases, the conference service 102 can be a cloud-based conferencing service or infrastructure.

The conference service 102 can host different conferences with respective participants connecting from endpoints in different geographic locations, networks, etc. Participants can join and interact with a conference hosted at the conference service 102 from their respective endpoints 106. The endpoints 106 can communicate with the conference service 102 via a network 120, in order to join and participate in a conference hosted by the conference service 102. The network 120 can include one or more public networks, such as the Internet; one or more private networks, such as a local area network; a combination of public and private networks; etc. The endpoints 106 can include any computing device with networking and conferencing capabilities, such as a smartphone, a tablet computer, a mobile media device, a gaming system, a smart television, a laptop computer, a conference phone or client, or any other smart or computing device.

The conference service 102 can support different conferencing clients and technologies. For example, the conference service 102 can support SIP clients, H.323 videoconferencing endpoints, WebEx video participants, WebEx audio-only participants, VoIP clients, PSTN clients, etc. The endpoints 106 can run specific software which enables users to participate in a conference on the conference service 102. For example, participants can use a conferencing application 112 at the endpoints 106 to join and participate in a conference on the conference service 102. The conferencing application 112 can function as a conference client at the endpoints 106. The conferencing application 112 can be a native client application configured specifically for conferences hosted by the conference service 102, a web browser application having specific functionalities for web conferencing, a client application that supports one or more conferencing technologies or protocols, or any other software application suitable for conferencing.

The conferencing application 112 can include various tools and capabilities, including software and/or hardware, for conferencing, such as network capabilities, video capabilities, audio capabilities, compression capabilities, NAT/Firewall traversal capabilities, one or more codecs, and so forth. Non-limiting examples of technologies that can be used by conferencing application 112 to participate, create or establish, manage, or otherwise support a conference hosted on the conference service 102 include SIP, H.263, H.264, H.264 High-Profile, H.264 SVC (SSL VPN client), H.239, H.320, H.323 SIP, VoIP, G.711, G.722, G.729, T.120, VP8, RTP, TCP/IP, HD video conferencing, remote frame buffer protocol, real-time protocol, and so forth.

The conferencing applications 112 can run on endpoints 106, and interact or interface with hardware and/or software components on the endpoints 106. For example, the conferencing applications 112 can interact with various hardware components, including input and/or output devices, such as a display, a camera, a microphone, a speaker, a peripheral device, a sensor, etc.; storage devices, such as memory, hard drives, flash drives, logical or physical disks, solid state drives, etc.; processing devices, such as microprocessors; and so forth. The conferencing applications 112 can also interact with other software applications and components on the endpoints 106, such as web browsers, chat or messaging clients, files, email clients, address books, calendars, notification systems, operating systems, etc.

Such interactions can be used by the conferencing applications 112 to support and/or augment conferencing communications and functionalities. For example, the conferencing applications 112 can communicate with a screen or display at the endpoints 106 to display a conference and present data received from conference service 102 and/or other endpoints. As another example, the conferencing applications 112 can communicate or interface with input devices, such as a camera and a microphone, to capture video and/or audio at the endpoints 106 for the conference. The conferencing applications 112 can pass the captured data to a network interface in order to send the data to the conference service 102 for the conference.

The conferencing applications 112 can provide a graphical user interface for the conference at the endpoints 106, such as a graphical conference interface. The graphical user interface can provide a presentation of a conference, which can include, for example, conference video, audio, content, communications, participants, presence information, tools, media feeds, and so forth. For example, the conferencing applications 112 can provide a graphical conference interface that presents a visual representation of a conference, as well as any tools or objects associated with the conference. In some cases, the graphical conference interface can be configured as a collaboration room which provides a virtual experience similar to an in-person conference in a conference room.

The graphical conference interface can present video and/or image feeds from participants in the conference which can enable participants to see each other in real time, for example. The graphical conference interface can present activity and interactions occurring in the conference (e.g., chat, messaging, and other communications), presence information, conference controls, collaboration tools and controls, etc. Non-limiting examples of graphical conference interfaces are further described below with reference to FIGS. 2-5.

The conferencing applications 112 can modify or update a graphical conference interface based on conference activity, such as speech, presentation activity, motion, etc. The endpoints 106 and/or conference service 102 can be equipped with one or more sensors or devices for detecting such activity. The detected activity can be configured to trigger changes in the graphical conference interface, such as updates to which participant is displayed as an active participant, as further explained below. Non-limiting examples of sensors or devices for detecting activity can include a camera, a microphone, a motion sensor, a speed sensor, a position sensor, a light sensor, a heat or temperature sensor, a touch sensor, an image sensor, a video sensor, a voice sensor, a biometric sensor, etc. Such sensors or devices can not only be used to detect certain activity but also detect noise or reduce false positive detections of activity. For example, one or more microphones, cameras, sensors, and/or detection systems can be implemented to distinguish speech from background noise.

As discussed above, the conference environment 100 in FIG. 1 is hosted by a conference service 102. This architecture is provided as a non-limiting example for the sake of clarity and explanation purposes. However, the concepts disclosed herein apply to other conference environments and architectures. For example, the concepts disclosed herein can apply to other architectures, such as peer-to-peer conferencing architectures or WebRTC, which may or may not include the conference service 102.

Figure 2A:
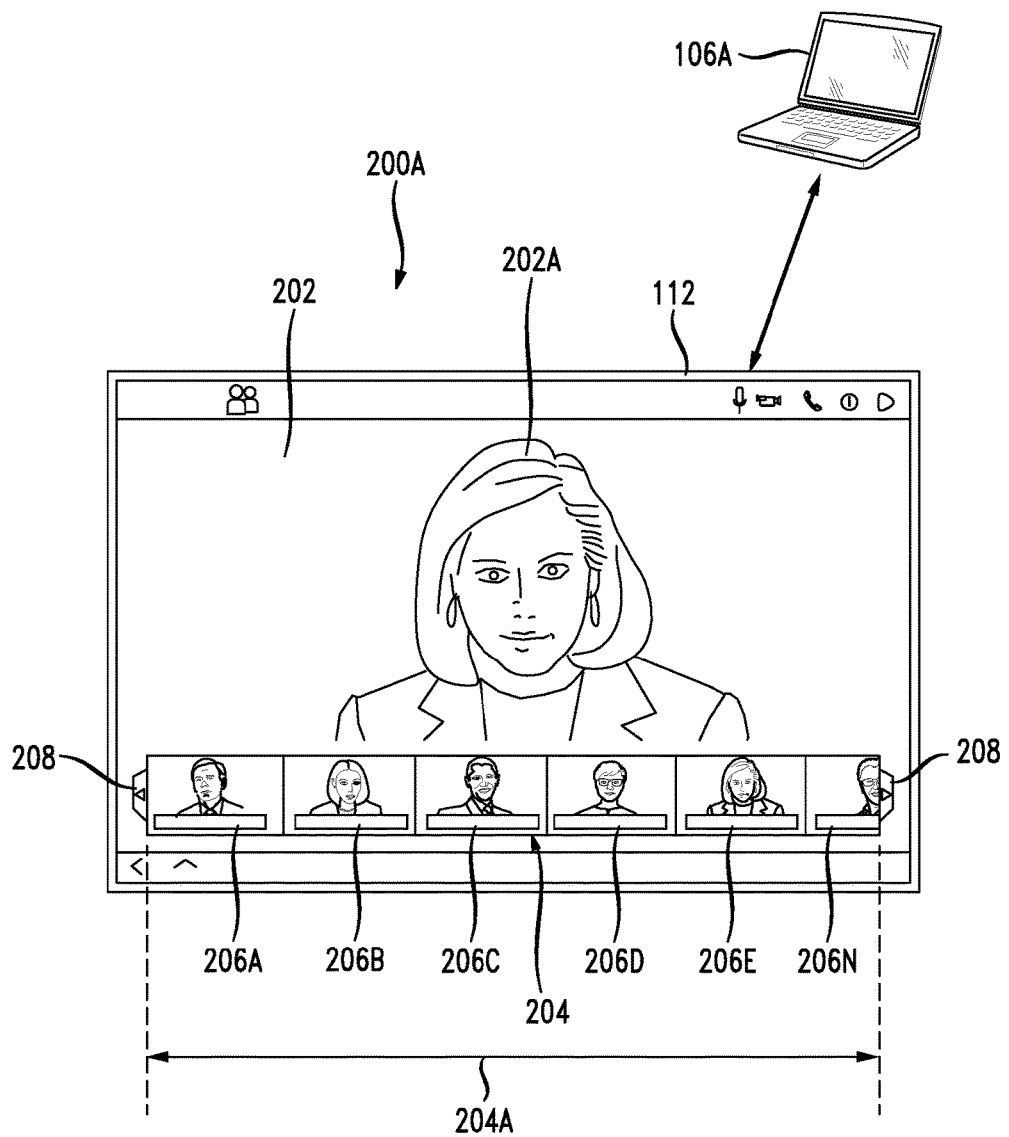
FIGS. 2A-B illustrate example conference views.

FIG. 2A illustrates an example view 200A of a conference showing an active participant 202A and a panel 204 of participants. This example view 200A illustrates a presentation at the endpoint 106 of a conference hosted by the conference service 102. The view 200A is presented by the conferencing application 112 at the endpoint 106A, to allow a user or participant at the endpoint 106A to view and participate in the conference from the endpoint 106A. The view 200A in this example can be specific to, or tailored for, endpoint 106A and/or the participant at endpoint 106A.

The conference view 200A can include a display region 202, which can be the main or primary display of the conference. The display region 202 can display an active participant 202A. The active participant 202A can refer to a specific participant that is determined to be currently of significance in the conference, such as a participant that is currently a main participant, an active participant, or a participant of interest. A participant can be designated as the active participant 202A based on conference activity, conference preferences, participant roles, etc. For example, the active participant 202A can be a current speaker, a moderator, a host, a speaker in a queue, a software agent or participant (e.g., a bot), a targeted participant, etc.

In some examples, a participant is designated as the active participant 202A based on current activity. Current activity can include, for example, current speech, current gestures, current movement, current input, etc. To illustrate, the active participant 202A can be the current speaker in the conference.

The participant designated as the active participant 202A can change dynamically. For example, the active participant 202A can dynamically change based on conference activity. To illustrate, speaker A can be the active participant 202A while speaker A is actively speaking, and speaker B can replace speaker A as the active participant 202A when speaker B becomes the active speaker. In this example, speaker A can be displayed in the display region 202 as the active participant 202A until speaker B becomes the active speaker, at which point speaker A will be replaced by speaker B in display region 202. As the active speaker changes, the active participant 202A displayed in the display region 202 can also change.

The conference view 200A can display a panel 204 of participants in the conference. The panel 204 can include participant representations 206A-N (collectively "206" hereinafter) of respective participants in the conference. A participant representation can include, without limitation, video, camera, image, live, and/or recorded feeds, streams, files, etc. The participant representations 206 can be provided as, or within, thumbnails, windows, tabs, frames, visual elements, interface objects, channels, files, display regions, and so forth. For example, the participant representations 206 in panel 204 and the participant representation associated with the active participant 202A can include respective video captured at the endpoints 106 in the conference.

The participant representations 206 and the participant representation of active participant 202A can allow the conference view 200A to display a live or recorded image or video of the conference participants, to allow participants to see each other. For example, the participant representations 206 and active participant 202A can provide a participant at endpoint 106A a virtual representation of the participants in the conference. The participant at endpoint 106A would be able to view the active participant 202A and participant representations 206 from endpoint 106A and obtain a virtual experience similar the experience in an in-person conference where all participants are physically present in the same conference room.

Figure 2B:
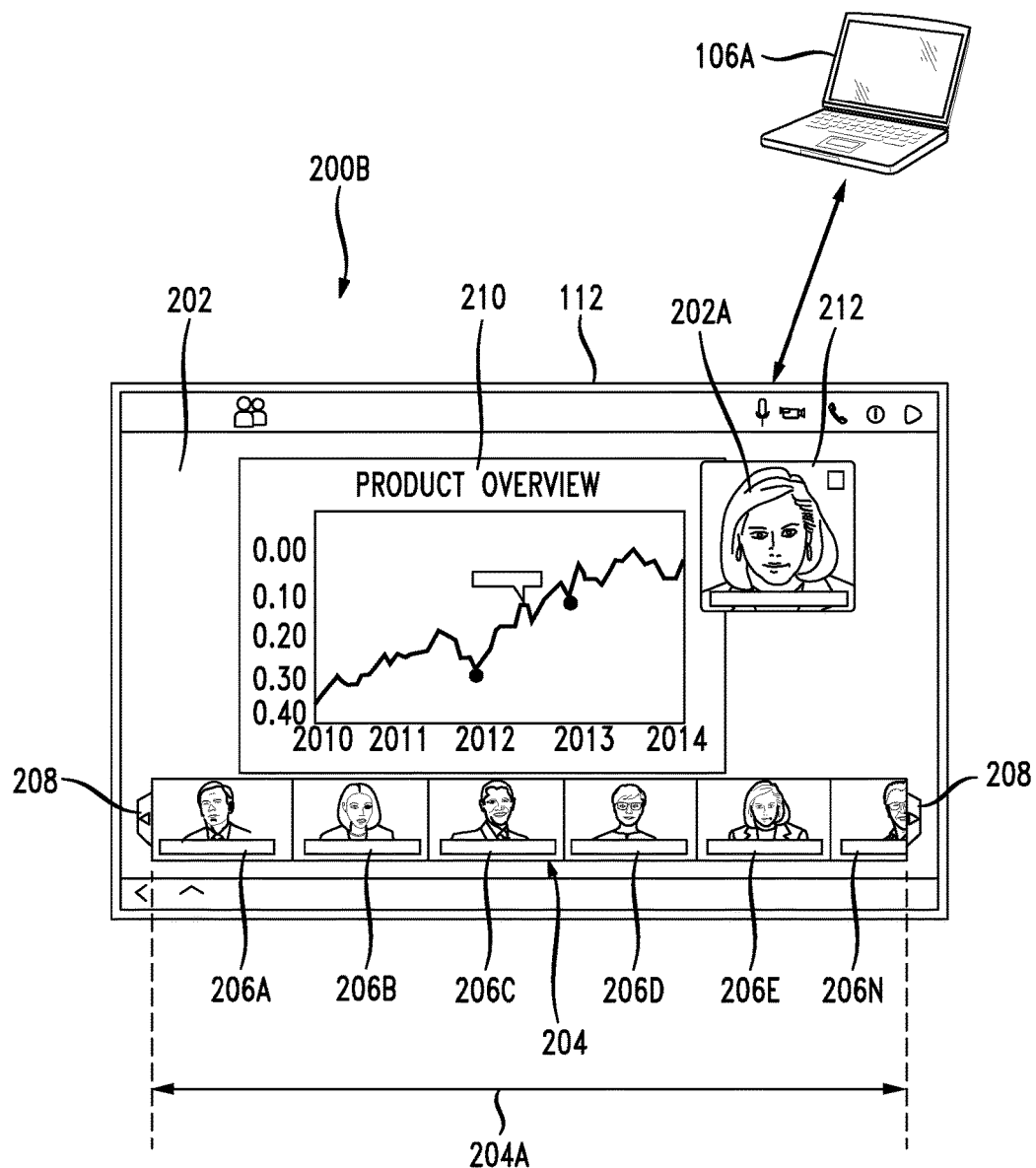

Referring to FIG. 2B, an example view 200B of the conference can also display an active object 210 in the display region 202. In this example, the display region 202 can display the active object 210 in addition to the active participant 202A. The active participant 202A is displayed in sub-region 212 within the display region 202, which can be more or less prominent on the display region 202 than the active object 210, depending on the particular configuration. The active object 210 and active participant 202A can also be re-arranged within the display region 202 by a specific participant and/or for one or more of the participants in the conference. For example, the active object 210 can be moved for presentation in the sub-region 212 and the participant 202 can be moved for presentation within (or around) the location where the active object 210 is moved from within the display region 202. Such re-arrangement of the active object 210 and active participant 202A can be performed manually and/or automatically based on one or more factors, such as current activity, user preferences, relative resolution or size of the active object 210 and active participant 202A, device settings and/or capabilities, conference settings, conference status, conference agenda or schedule, participant requests, etc.

The active object 210 can be any object(s) selected for presentation on the display region 202 for one or more conference participants. For example, the active object 210 can be an object shared with participants in the conference, highlighted or discussed in the conference, uploaded by a participant via the conferencing application 112, identified or suggested for presentation based on a relevance to the conference or a portion of the conference (e.g., relevant to a current topic or discussion, relevant to the current speaker, etc.), set for presentation during a particular point in the conference (e.g., content set for presentation based on a conference agenda or calendar), or selected for presentation in the conference by any mechanism including manual and/or dynamic presentation mechanisms.

In some examples, the active object 210 can be selected by a participant, such as the active participant 202A; a moderator; a host; the conference service 102; a software agent or participant; or any other participant. Moreover, the active object 210 can change dynamically and/or manually throughout the conference. For example, a participant can select, share or upload an object, which can replace another object presented as the active object 210 in the display region 202, and thus cause the other object to be displayed as the active object 210 in the display region 202.

The active object 210 can include a single object, such as a single content item, but may also include multiple objects, such as a group of content items. Moreover, the active object 210 can include any content item or software object. Non-limiting examples of such content items or software objects can include an agenda, a document or file, a folder, an image, a video, a web page, a shared screen, a presentation, a widget, a window or graphical user interface, conference information or data, a background set, an application interface and/or element (e.g., a browser window, a control element, etc.), a video feed, an audio playback element, a sidebar, a communication session (e.g., an instant messaging session, a chat, an email, a phone call, etc.), a graphic, a separate conference and/or conference window, etc.

As illustrated in FIGS. 2A and 2B, the panel 204 can have a display width 204A which sets the visible area of the panel 204. The display width 204A can be a fixed or maximum width. For example, the display width 204A can be fixed for a participant, a conference, a conferencing application 112, a conference view, and/or an endpoint. For example, the display width 204A may be fixed, which may prevent the participant at endpoint 106A from increasing or decreasing the display width 204A of the panel 204. In other examples, the display width 204A of the panel 204 may be adjustable or variable up to a limit or maximum. For example, the display width 204A can be a maximum width in a configuration that may allow a user to reduce the width of the panel 204 or increase the width of the panel 204 up to the maximum width corresponding to display width 204A. In such examples, the display width 204A can change based on user input (e.g., user resizing), the number of participants in the conference, conference characteristics, conference status or conditions, conference activity, preferences, activity at endpoint 106A, etc.

The display width 204A can set or define a maximum width that is based on, or influenced by, one or more factors, such as capabilities at endpoint 106A (e.g., display size and/or capabilities), screen resolution at endpoint 106A, number and/or configuration of screens or displays at endpoint 106A, conference parameters (e.g., conference requirements, preferences, rules, size, etc.), user preferences, screen size, number of participants in the conference, conference activity, status or preferences of display region 202 (e.g., number of active participants in the display region 202, number or size of objects in the display region 202, size or resolution of the display region 202, etc.), type of conference (e.g., web conference, video conference, multimode conference, etc.), type or platform of conferencing application 112 at the endpoint 106A (e.g., web browser, browser element or extension, software-based video and/or telepresence client, mobile application, etc.), scaling preferences (e.g., scaling of display region 202 and/or panel 204, etc.), window size, and so forth.

The display width 204A can limit or constrain the number of participant representations which can be presented or visible within the panel 204 at any particular time (e.g., concurrently). For example, the display width 204A can be sufficient to fit up to a specific number of participant representations, which can depend on the size and configuration of the participant representations. If the specific number of participant representations that fit within the display width 204A is less than the number of total participants or participant representations in the conference, then one or more participant representations may not be visible or may be partially visible within the display width 204A of the panel 204. For example, as illustrated in FIG. 2A, the participant 206N may only be partially visible in the panel 204 within the display width 204A. The user would have to move the participant 206N, or navigate (e.g., scroll) the panel 204 as further described below, to allow the participant 206N to become fully visible.

Any participant representations that do not fit within the display width 204A may be stacked with other participant representations, hidden from view in the panel 204, loaded outside of the display width 204A, or only loaded when a triggering event causes such participant representations to be placed within the display width 204A of the panel 204. The display width 204A of the panel 204 contains the visible participant representations in the panel 204, but the participant representations, arrangements, and configurations within the display width 204A of the panel 204 can change in response to triggering events, such as user scrolling or navigation, conference activity such as active speaker or object changes, user input (e.g., move operations such as drag and drop), etc.

Accordingly, in some cases, configurations and arrangements of participant representations can vary at times and/or at different endpoints. For example, in some cases, one or more participant representations may be hidden altogether from view or removed from the panel 204, stacked with one or more other participant representations, moved outside of the visible portion (i.e., display width 204A) of the panel 204 to a frame or region of the panel 204 that is not visible (e.g., a location outside of the display width 204A of the panel 204), minimized, added to a separate window or panel that is not always loaded or visible (e.g., a video element not visible unless a specific triggering event occurs), presented as a list, etc. Thus, the panel 204 can be configured or otherwise arranged to limit the number of participant representations presented within the display width 204A of the panel 204, as necessary based on the particular preferences, circumstances and/or limitations, for example.

To allow a user to access participant representations which are not displayed within the panel 204, the panel 204 can include navigation elements 208. The navigation elements 208 can allow the user to navigate or scroll through participant representations in the panel 204, including participant representations which are outside the display width 204A of the panel 204. For example, the panel 204 may include 50 participant representations for 50 total participants in a conference, but only 10 of the participant representations may be visible or fit within the display width 204A of the panel 204, while the remaining participant representations may not be visible or fit within the display width 204A of the panel 204. Thus, the user may only see 10 participant representations at a given time. If the user wants to see any of the participant representations that are not visible within the display width 204A of the panel 204, the user can use the navigation elements 208 to scroll or navigate the panel 204 to access any of those participant representations.

The navigation elements 208 can allow the user to scroll participant representations. For example, the user can select the navigation elements 208 to scroll through participant representations in the panel 204 to bring other participant representations within the display width 204A of the panel 204, so those participant representations are visible within the view 200. In some cases, the panel 204 can function like a carousel, with the navigation elements 208 enabling scrolling.

The user may also manually move specific participant representations or reorganize participant representations. For example, the user can select or drag and drop a participant representation into a different position within the panel 204. Moreover, participant representations can also be aligned, organized, or dynamically reorganized based on one or more factors. For example, participant representations can be organized or aligned within the panel 204 based on respective communication modalities, current and/or past activity, sorting preferences (e.g., by name), priorities, location, a first served basis (e.g., first-come, first-serve basis), etc.

To illustrate, conference views 200A and 200B in FIGS. 2A and 2B show participant representations 206A-E visible within the display width 204A of the panel 204. Participant representation 206N is also shown as partially visible, with a portion being truncated or falling outside of the display width 204A. If desired, the user can use navigation elements 208 or selective move operations (e.g., drag and drop) to scroll or browse other participant representations. As the user navigates or scrolls using navigation element 208 on the right of the panel 204, the visible portion of the participant representation 206N can increase, while the visible portion of participant representation 206A can begin to fall outside of the visible portion of the panel 204. If the user continues to navigate or scroll to the right, other participant representations adjacent to the right of the participant representation 206N can increasingly become visible within the panel 204, while participant representations 206B and 206C, which are adjacent to the right of the participant representation 206A, can increasingly begin to fall outside of the display width 204A of the panel 204. Thus, the user can use navigation elements 208 to selectively navigate or scroll in either direction to access participant representations that are not visible within the display width 204A of the panel 204, and modify which participant representations are visible within the display width 204A of the panel 204 using navigation elements 208 and/or moving operations.

The state (e.g., organization or configuration) of the panel 204 can change dynamically based on events, such as conference activity (e.g., speaker changes, participant activity, etc.). For example, the conferencing application 112 may always display the active speaker as the active participant 202A within the display region 202. When the active speaker changes, the participant representation for the active participant 202A can change, and the participant representations 206 displayed in the panel 204 may also change.

To illustrate, if participant representation 206B is currently displayed within the panel 204 and the participant associated with participant representation 206B becomes the active speaker, the participant representation 206B may then become the active participant 202A, causing the participant representation 206B to be displayed in the display region 202 as the active participant 202A. While the participant representation 206B is displayed in the display region 202 as the active participant 202A, it may be unnecessary or redundant to also show the participant representation 206B within the panel 204. Thus, in some configurations, the participant representation 206B may be replaced in the panel 204 by another participant representation while the participant representation 206B is displayed in the display region 202 as the active participant 202A.

However, in other cases, participant representation 206B may be displayed in the panel 204 as well as display region 202 even while participant representation 206B is the active participant 202A. The particular configuration of the panel 204 in response to changes in active participant can thus vary, and changes in the conference and activity in the conference can cause changes in the panel 204. For example, when a participant becomes the active participant 202A and is displayed in the display region 202, the respective participant representation of that participant can also be removed from the panel 204, moved to a specific location in the panel 204 such as a location within or outside of the display width 204A of the panel 204, maintained within a current location (visible or not) in the panel 204, or set to remain visible within the display width 204A of the panel 204.

As previously explained, the conference service 102 can support large conferences, which can result in a large number of participants in a conference. Accordingly, in some cases, the number of participant representations in a conference may exceed the display width 204A of the panel 204, which can cause the conferencing application 112 to limit or reduce the number of participant representations presented concurrently or at any given time within the display width 204A of the panel 204. To this end, the display width 204A can impose limits on the number of participant representations that may be displayed in the panel 204 concurrently or at any given time.

The number of participant representations displayed in the panel 204 can thus depend on the display width 204A of the panel 204. In some cases, particularly as the number of participants in a conference increases, the display width 204A may not be sufficient to fit or display the participant representations of all participants in the conference concurrently or at the same time, more so as the number of participants in the conference increases. Thus, depending on the display width 204A of the panel, some participant representations may not be visible within the panel 204 at certain times unless the panel 204 is re-arranged, as the number of participant representations in the conference may exceed the number of participant representations that fit within the display width 204A of the panel 204.

The number of participant representations that fall outside of the panel 204 will increase as the number of participants in the conference increases. Because the conference service 102 may support conferences with hundreds or thousands of participants, some conferences may result in a large number of participant representations that fall outside of the panel 204. This may require significant amounts of scrolling or navigation from the user to view certain participant representations.

Often times, a participant in a conference may want to have a more permanent view of one or more other participants in the conference. For example, an employee in the conference may want to follow her boss and have access to her boss's video feed throughout the conference in order to, for example, see the demeanor, reactions, body language, projected levels of interest, etc., of her boss throughout the conference. This information may help the employee infer or assess what, if any, discussions may have resonated with her boss, how much acceptance or enthusiasm was projected by her boss during specific discussions, and so forth. In another example, a participant may want to follow her clients, the board members, or other specific participants or groups of participants attending the conference, to gauge their respective reactions. The participant may even want change which participant to follow at different points of the conference.

However, in larger conferences that include more participant representations that fit within the display width 204A of the panel 204, it may be difficult or impossible for the user at the endpoint 106A to ensure that one or more participants of interest remain visible within the display width 204A of the panel 204. For example, the number of participants the user wants to follow at a particular time may exceed the number of participant representations that fit within the display width 204A of the panel 204. Accordingly, some of the participants may not be visible in the panel 204. As another example, conference activity and changes in the panel 204 can cause a participant representation of interest to be moved outside of the display width 204A of the panel, such that the participant representation is not visible within the panel 204 until or unless another re-arrangement event (e.g., scrolling, activity-triggered changes, move operations, etc.) brings that participant representation within the visible portion of the panel 204 (i.e., within the display width 204A).

This can cause the user to lose visibility of one or more participants of interest at one or more points in the conference, and may be disruptive to the user as the user may become distracted when scrolling or re-arranging the panel 204 to bring the participants of interest within the visible portion of the panel 204. Such distraction can be greatly exacerbated as the number of participants in a conference increases, which may result in additional scrolling time or difficulty in finding particular participants, and as the frequency of changes or re-arrangements of the panel 204 increases. As previously noted, changes and re-arrangements to the panel 204 can be manual and/or dynamic, and may be triggered by one or more conditions or events. Thus, in some conferences, changes or re-arrangements to the panel 204 can be triggered with greater frequency, increasing the difficulty for the user to follow specific participants and the distraction to the user from an increase in time spent manually updating the panel 204 as desired.

Figure 3A:
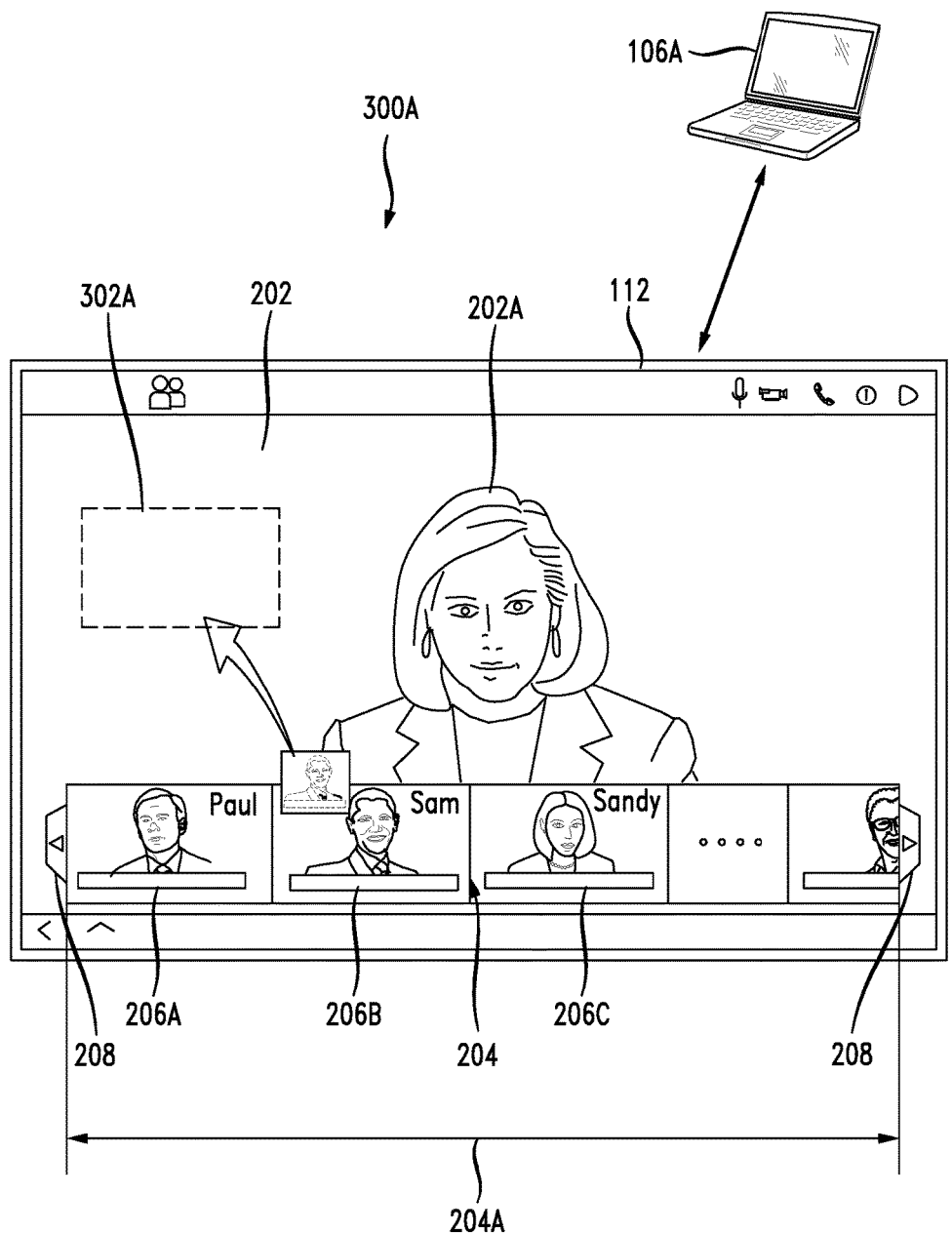
FIGS. 3A-E illustrate example conference views for following participants and objects.

The approaches herein enable users to follow a participant (e.g., maintain a fixed, permanent, or prolonged view of the corresponding participant representation) throughout the conference or a desired portion of the conference. FIG. 3A illustrates an example view 300A for following a participant in a conference. The view 300A provides an example view for the conference participant at endpoint 106A.

In this example, participant representations 206A, 206B, and 206C are displayed within the display width 204A of the panel 204. Participant representation 206D is partly displayed in the panel 204, with a portion not displayed as it exceeds the display width 204A. Moreover, the user can move a participant representation from the panel 204 to a location that is outside of the panel 204 and within the display region 202, in order to follow the associated participant. For example, the user can move the participant representation 206B to persistent location 302A, which is outside of the panel 204 but within the display region 202. In turn, the participant representation 206B can remain visibly displayed in the persistent location 302A within the display region 202. This will allow the user to follow the participant representation 206B, and ensure the participant representation 206B is visible within the display region 202 irrespective of any changes to the active participant 202A or the panel 204.

The participant representation 206B can remain permanently fixed in the persistent location 302A throughout the conference or until a triggering event causes the participant representation 206B to be removed from the persistent location 302A. Non-limiting examples of triggering events can include user input, conference preferences, user request to follow a threshold number of other participants, etc. For example, the conferencing application 112 may allow a participant to follow a number of participants. If the participant selects a number of participants to follow in excess of the allowed number of participants, the conferencing application 112 may stop following, or prompt the participant to stop following, one or more participants to reduce the number of participants to the allowed number of participants. When the conferencing application 112 stops following a participant, that participant may be removed from display in the display region 202, and only display the participant in the panel 204 and/or as active participant 202A if the participant becomes the active speaker.

The persistent location 302A can be anywhere in the display region 202 outside of the panel 204, as long as the active participant 202A is not blocked from view by the selected participant representation. Moreover, after the user moves the participant representation 206B to the persistent location 302A, the user can move the participant representation 206B to other locations within the display region 202, as further explained below.

The user can select any participant and affix the participant's representation to the persistent location 302A. This way, the user can specifically select a participant of interest to that user. The selected participant representation can then be moved to the persistent location 302A and displayed accordingly in the view 300A at the endpoint 106A. This move or change may not be propagated to, or reflected on, the views provided to other participants at different endpoints. Thus, each user can customize their own conference view.

When the user moves the participant representation 206B to the persistent location 302A, it can cause the participant representation 206B to be removed from the panel 204. This will allow another participant representation to become visible within the panel 204. For example, the removal of the participant representation 206B from the panel 204 can create additional space within the display width 204A of the panel 204, which may allow the participant representation 206D to shift further within view in the panel 204 to allow any portion of the participant representation 206D that was not visible within the panel 204 to become visible. Depending on space, other participant representations may also come into view—either partly or fully—within the panel 204.

However, in other cases, moving the participant representation 206B to the persistent region 302A may not cause the participant representation 206B to be removed from the panel 204. For example, the participant representation 206B can be displayed in the persistent location 302A, and remain in the same location on the panel 204 or remain within the panel 204 but moved outside of the visible portion (i.e., display width 204A) of the panel 204.

If the participant representation 206B becomes the active speaker, the conferencing application 112 can display the participant representation 206B in the display region 202 as the active participant 202A. In this case, the participant representation 206B may be displayed in the persistent location 302A while the participant representation 206B is also displayed as the active participant 202A in the display region 202. However, in some cases, when the participant representation 206B becomes the active participant 202A, the conferencing application 112 can remove the participant representation 206B from the persistent location 302A to avoid redundant displays of the participant representation 206B within the display region 202, at least until the participant representation 206B is no longer the active participant 202A. In this case, the participant representation 206B can be automatically moved back to the persistent location 302A and/or the panel 204 when the participant representation 206B is no longer the active participant 202A.

The specific behavior or configuration of the participant representation 206B with respect to display in the persistent location 302A or the panel 204 before, during, and/or after the participant representation 206B is displayed as the active participant 202A can depend on one or more factors, such as user preferences, conference preferences, user input, display capabilities, conferencing application 112 settings, current events in the conference, current elements displayed in the display region 202, window settings, screen resolution, etc. Moreover, the number and arrangement of persistent regions, such as persistent location 302A, for displaying participant representations selected from the panel 204 can vary as further described below.

Figure 3B:
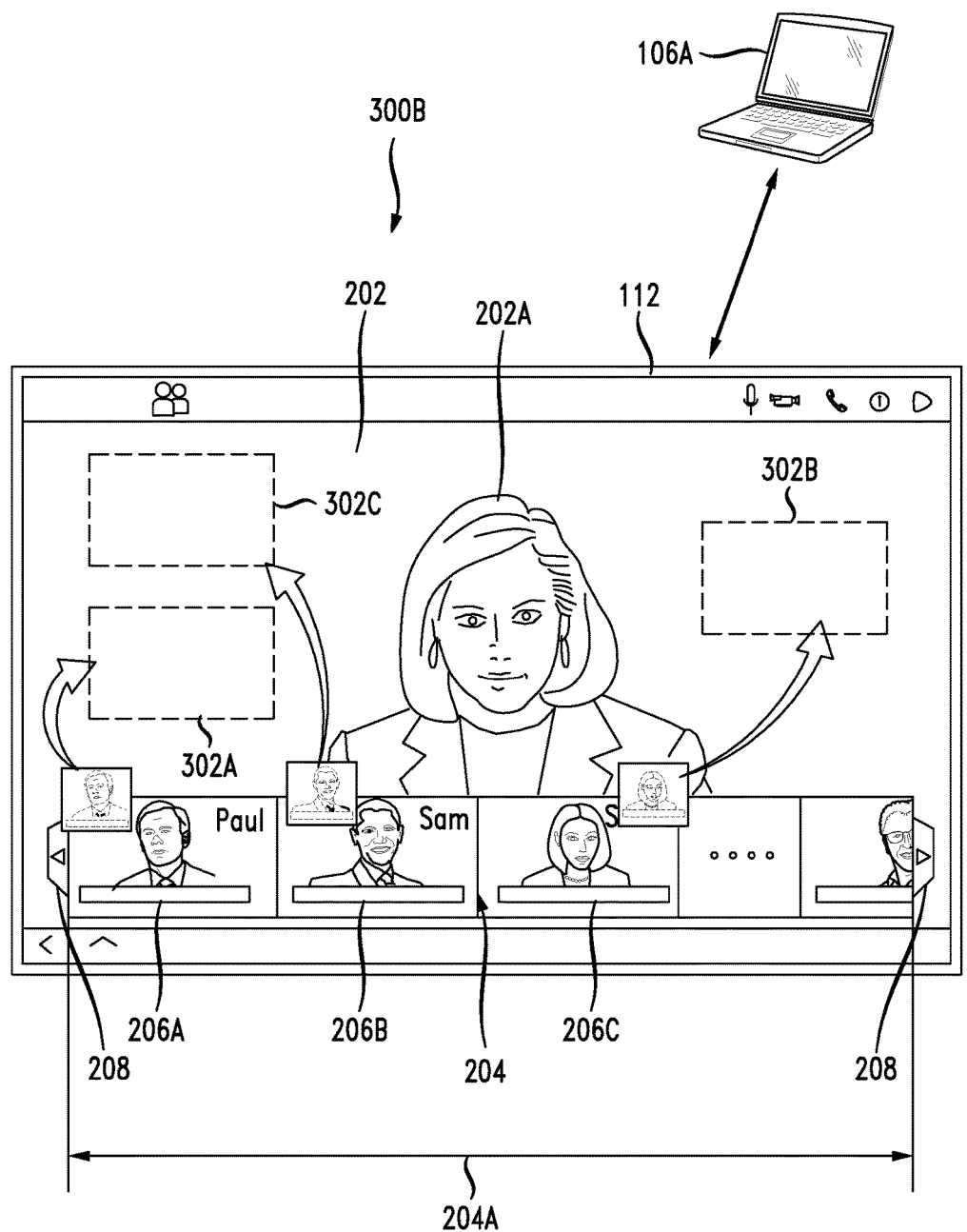

For example, referring to view 300B illustrated in FIG. 3B, the participant at endpoint 106A can move additional participant representations to other persistent locations outside of the panel 204. To illustrate, the participant can also move participant representations 206B and 206C to persistent locations 302C and 302B. This way, the participant can follow multiple other participants. The participant can also move and re-arrange the persistent locations 302A-C as desired.

Figure 3C:
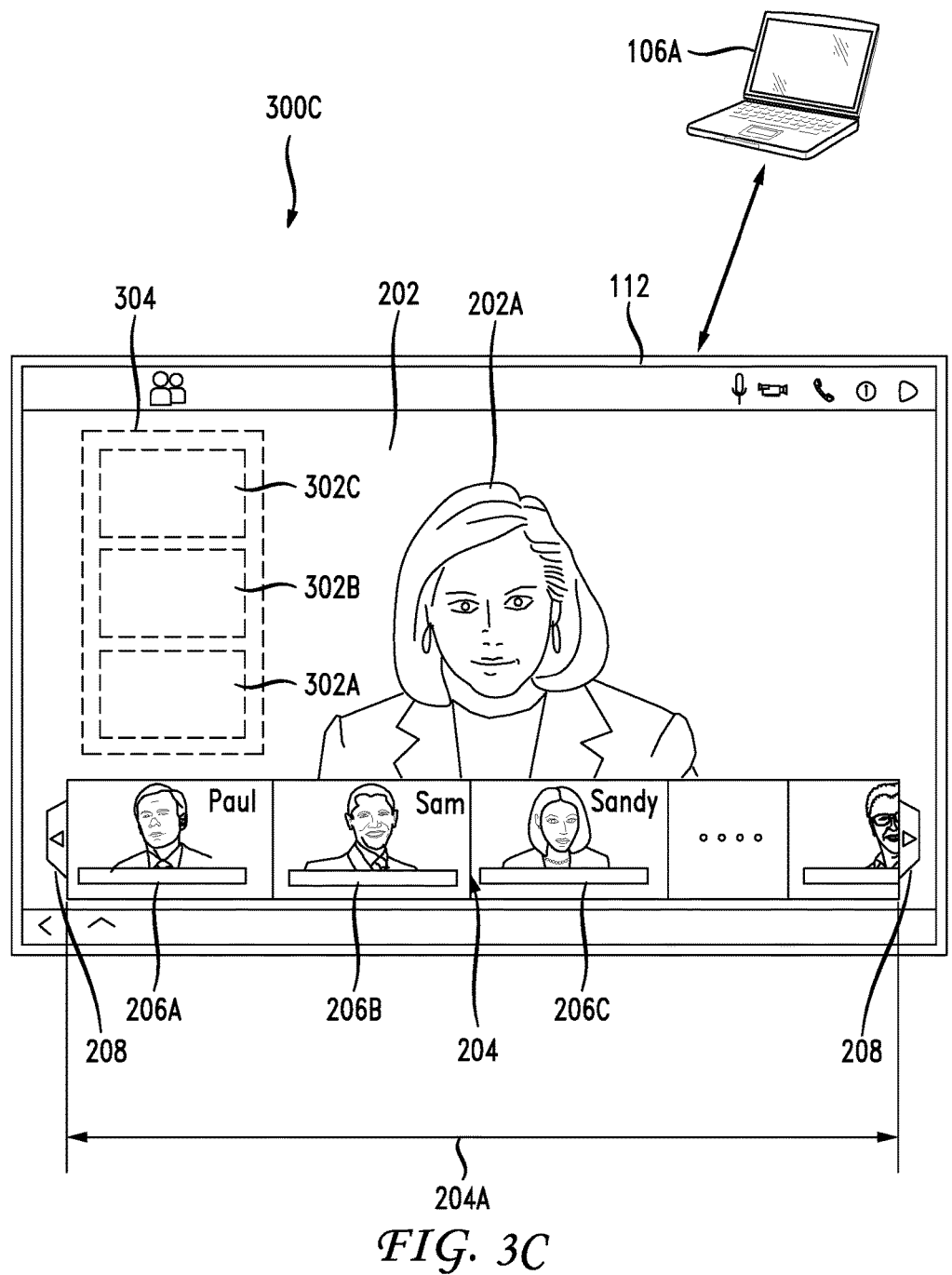

Referring to view 300C illustrated in FIG. 3C, the persistent locations 302A-C can be arranged within an area 304 of the display region 202. The area 304 can be set or selected by the user or configured in the conferencing application 112. For example, the conferencing application 112 may only enable the area 304 within the display region 202 for moving participant representations and/or creating persistent locations 302A-C.

Further, the arrangement of the persistent locations 302A-C, and/or the participant representations displayed in the persistent locations 302A-C, within the area 304 can be configured according to a specific organization, ordering, prioritization, preferences, conditions, etc. For example, participant representations moved to the persistent locations 302A-C within the area 304 can be re-arranged within the area 304 and/or the persistent locations 302A-C according to associated participant activity, participant priorities, participant roles, etc.

To illustrate, the area 304 can be configured to sort the persistent locations 302A-C or associated participant representations based on speaking frequency, time elapsed between respective speaking activities, job titles, and so forth. For example, the conferencing application 112 can keep the persistent location 302C at the top of the area 304, above persistent locations 302A and 302B, and assign the persistent location 302C at the top of the area 304 to the most active or most-recently active participant from the participants associated with the participant representations that have been moved by the user to a persistent location within the area 304. The conferencing application 112 can dynamically re-arrange the participant representations in the persistent locations 302A-C to ensure the participant representation of the most active or most-recently active is always in the persistent location 302C at the top of the area 304. The remaining participant representations in the persistent locations 302A and 302B can also be similarly ordered so that the more active or more-recently active participant is placed in persistent location 302B above persistent location 302A.

The parameter of most active or most-recently active provided in the above example is simply one non-limiting example used for explanation purposes. Other factors can also be used for arranging and re-arranging participant representations within the persistent locations 302A-C in the area 304, such as user preferences, priorities, discussion topics, participant expertise, participant role or title, participant relationship to the participant at the endpoint 106A, etc.

Figure 3D:
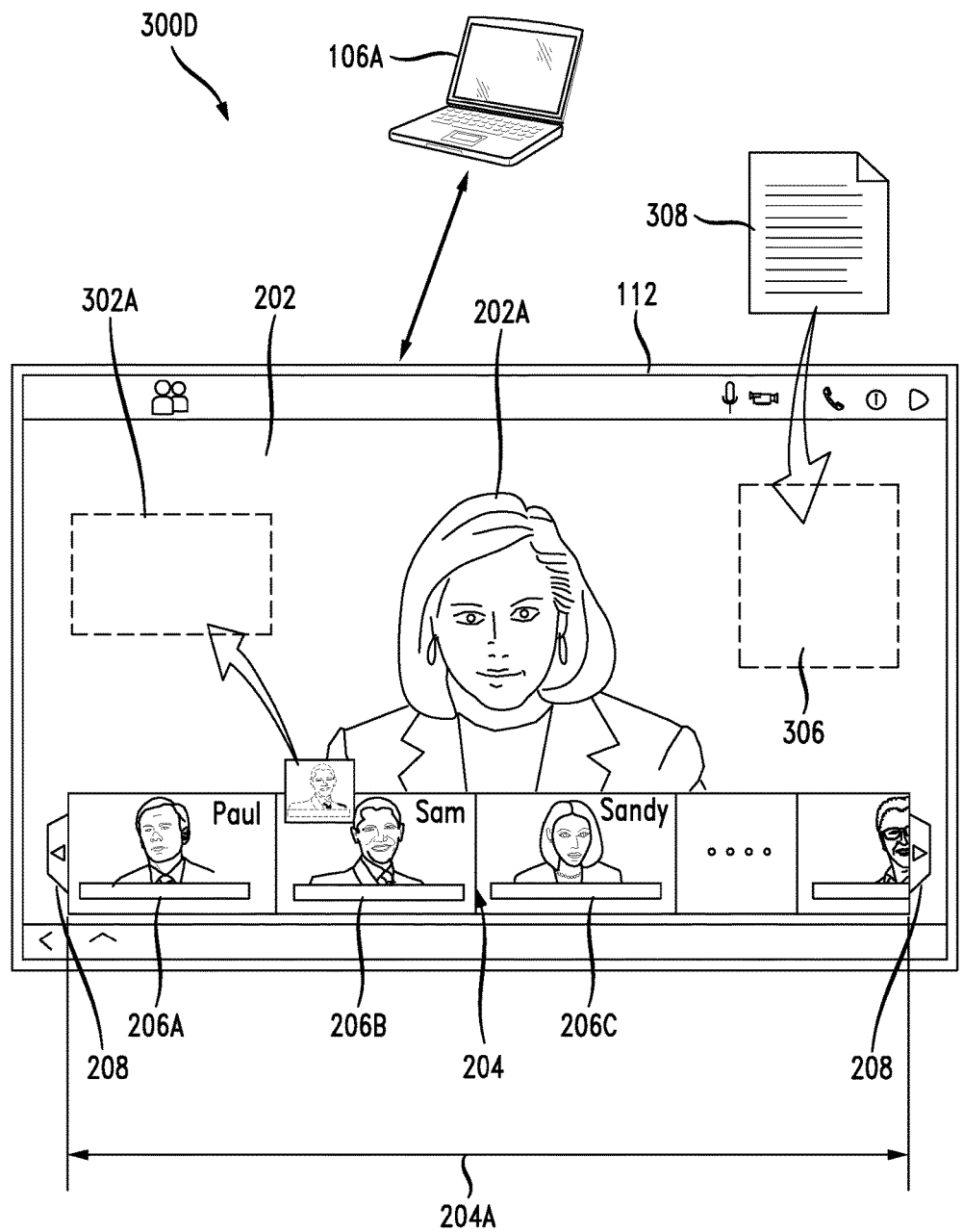

Referring to FIG. 3D, view 300D can display an object 308 in a persistent object location 306 within the display region 202. This can allow the participant at endpoint 106A to view the object 308 throughout the conference, unless otherwise moved from the persistent object location 306. For example, the participant at endpoint 106A may place a spreadsheet, chart, or agenda in the persistent object location 306 for display concurrently with the active participant 202A and any participant representation moved to a persistent location within the display region 202, such as persistent location 302A. The spreadsheet, chart, or agenda may be pertinent to the conference or a current discussion topic. Thus, it may be helpful to the participant to be able to view the spreadsheet, chart, or agenda during the conference.

The object 308 can be selected for placement in the persistent object location 306 by the participant at endpoint 106A, the conferencing application 112, or another participant. For example, the object 308 can be placed in the persistent object location 306 in response to the participant at endpoint 106A uploading and/or moving the object 308 for placement in the persistent object location 306 or another participant sharing the object with the participant at endpoint 106A or the conference. As another example, the conferencing application 112 can select the object 308 for placement in the persistent object location 306 based on one or more factors, such as a relationship or relevance to a conference agenda item(s), a relevance to a topic associated with the conference, a relevance to a current discussion, a relevance to the active participant 202A, a user preference and/or input, a conference setting, a conference context, etc.

The object 308 can be displayed in the persistent object location 306 for the individual participant at the endpoint 106A, a group of specific participants, or the entire conference (e.g., every participant). For example, the object 308 can be shared with all participants in the conference and thereafter placed on the persistent object location 306 in the view or interface of every participant. In other examples, the object 308 may be specifically selected by the participant at endpoint 106A to be displayed in the persistent object location 306 only for that participant.

The persistent object location 306 can also be configured to display objects according to current conference activity. For example, the persistent object location 306 may display the active object in the conference, which can include the object being discussed or addressed, the object scheduled for a current slot in the conference agenda, an object currently selected or shared by one or more participants, etc. Thus, in this example, the object displayed in the persistent object location 306 can dynamically change as another object becomes the active object, similar to how the active participant 202A can change based on participant activity.

Figure 3E:
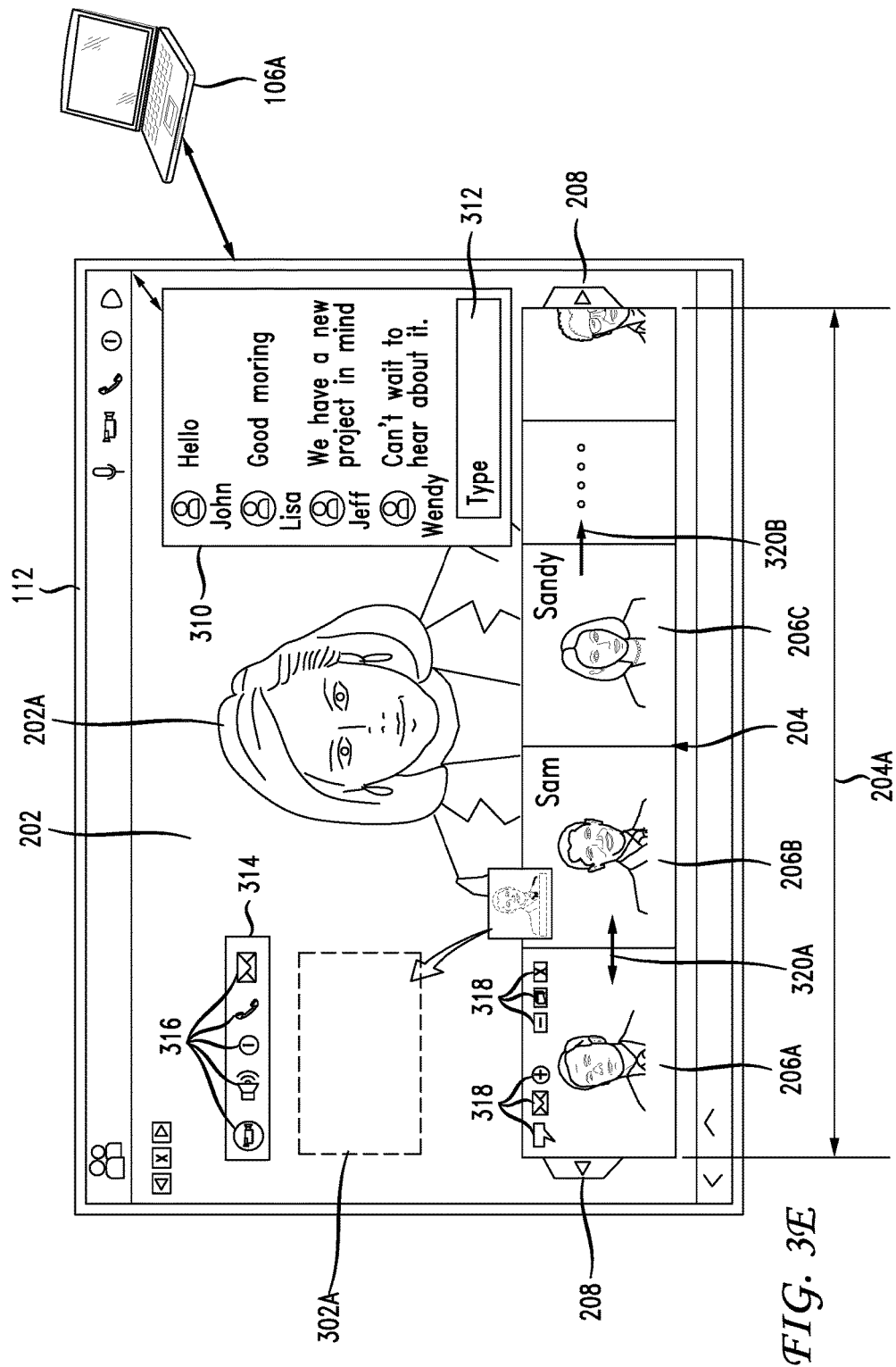

FIG. 3E illustrates an example view 300E of a conference interface at endpoint 106A. In this example, the conferencing application 112 can present an interface object 310 for conducting additional communication sessions during the conference. The interface object 310 can be presented within the display region 202 or as a separate window or frame. The interface object 310 can support one or more communication modalities, such as instant messaging sessions or chats. The interface object 310 can include an input region 312 to provide inputs and messages for a corresponding communication session.

The interface object 310 can thus allow the participant at endpoint 106A to communicate with other participants in a different modality during the conference. In some cases, the interface object 310 and associated communication(s) can be presented to all participants in the conference or a group of participants. For example, the interface object 310 and associated communication(s) can be presented to a selected group of participants that have joined a communication session. In some cases, the interface object 310 can allow the participant to initiate a sidebar or chat with one or more participants in the conference.

The conferencing application 112 can also present collaboration controls 316, which can be presented within a collaboration control region 314. Collaboration controls 316 can include, without limitation, controls for managing communications or communication sessions, such as sending an email, making a call, establishing a video call, etc.; controls for managing functionalities for the conference, such as recording audio and/or video, enabling or disabling a camera available at the endpoint 106A, controlling the volume of the conference, etc.; controls for managing collaboration preferences, such as voice and video settings, security settings, display settings, etc.; controls for adding content, such as uploading content or objects; and so forth.

Participant representations 206 can similarly include controls 318 for managing display preferences and/or interactions with corresponding participants. For example, participant representations can include controls 318 for messaging a participant, adding a user to a session or group, closing a participant representation, etc.

Moreover, the panel 204 can enable move operations 320A-B for participant representations 206 within the panel 204. For example, a swap operation 320A can allow the user to swap the placement of participant representations 206A and 206B within the panel 204, and a shift operation 320B can allow the user to move participant representation 206C to a different slot within the panel 204. The move operations 320A-B can be executed via drag and drop, user selections, and any other user input or gesture.

Figure 4A:
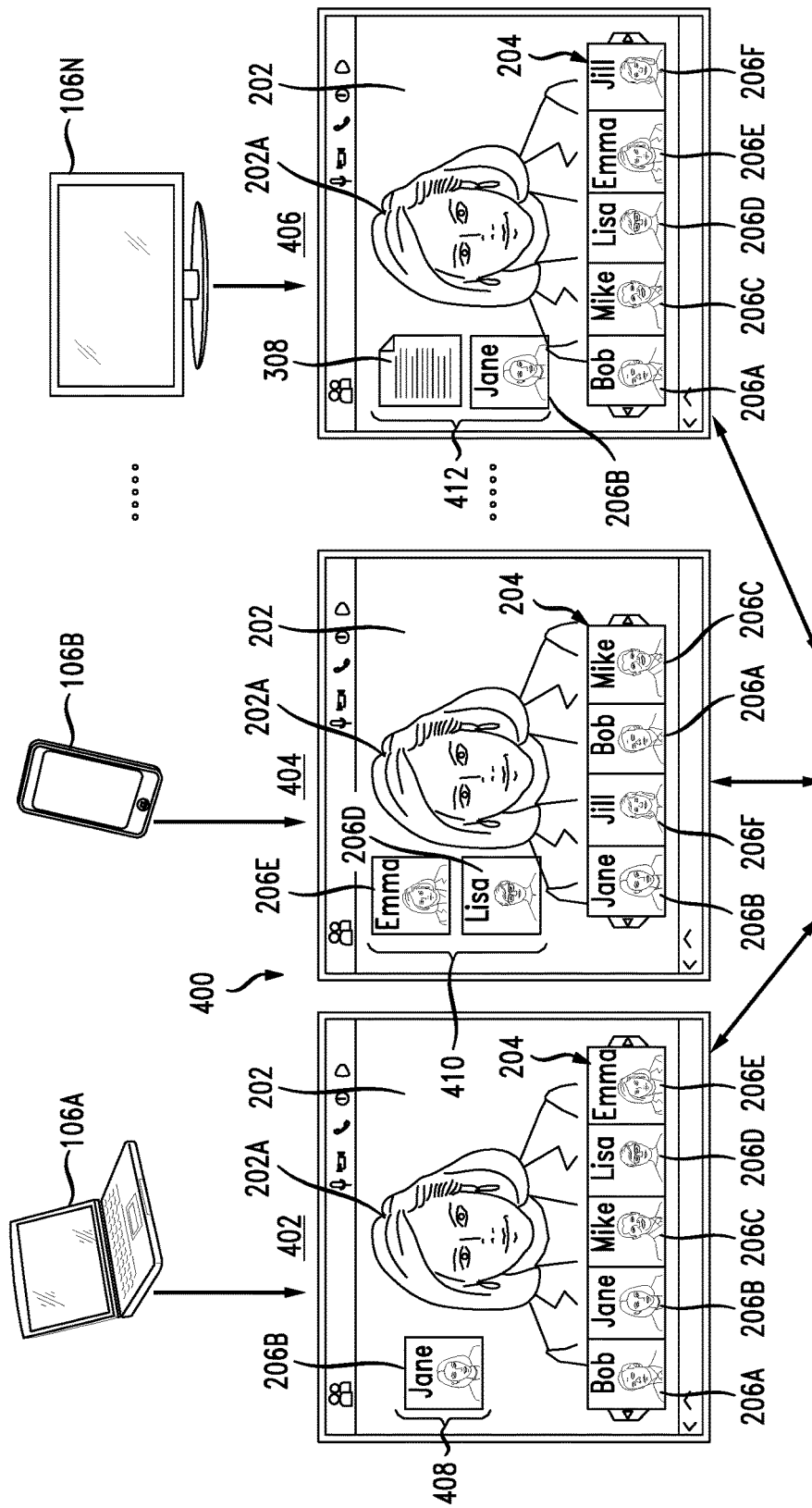
FIG. 4A illustrates an example conference with customized participant views across endpoints.

FIG. 4A illustrates an example conference 400 with customized participant views 402, 404, 406. Participant views 402, 404, 406 can represent the views of participants at the different endpoints 106 in the conference. As illustrated, the participant views 402, 404, 406 can vary at each endpoint, thus allowing participants to receive a customized view of the conference 400.

As illustrated in FIG. 4A, each of the participant views 402, 404, 406 can display the active participant 202A within the display region 202, the panel 204, and customized persistent states 408, 410, 412. The persistent states 408, 410, 412 can be based on which participant representations and/or objects have been moved by the respective users to a persistent location within the display region 202. For example, the persistent state 408 shows participant representation 206B displayed in the display region 202 and outside of the panel 204, indicating that the user at endpoint 106A has moved participant representation 206B to a persistent location. The persistent state 410 shows participant representations 206E, 206D displayed in the display region 202 and outside of the panel 204, indicating that the user at endpoint 106B has moved those participant representations to a persistent location. The persistent state 412 shows participant representation 206B and object 308 displayed in the display region 202 and outside of the panel 204, indicating that the user at endpoint 106N has moved participant representation 206B and object 308 to a persistent location.

Moreover, the arrangement and display of participant representations within the panel 204 can differ in the various participant views 402, 404, 406. For example, the panel 204 in participant view 402 can display participant representations 206A-E, while the panel 204 in participant view 404 displays participant representations 206B, 206F, 206A, 206C, and the panel 204 in participant view 404 displays participant representations 206A, 206C, 206D, 206E, 206F. Thus, the number, organization, and/or identity of participant representations displayed within the panel can vary in the various participant views 402, 404, 406. Such variations can be based on specific user preferences, user activity, user inputs and customization, etc.

The state of the views 402, 404, 406 can be maintained and/or managed by the conference service 102 and/or the respective endpoints 106. For example, the state of each view can be managed by the conference service 102 and the conferencing application 112 at the respective endpoint. The individual state information allows participants to obtain customized views 402, 404, 406, without propagating or synchronizing specific changes throughout the entire conference.

However, the conference service 102 can also synchronize and propagate some or all conference data and settings to the different endpoints 106. For example, in some cases, the conference service 102 can propagate changes in the active participant 202A to the endpoints 106 in the conference 400, or synchronize other changes and information. The conference service 102 may also push fixed settings or elements to the different endpoints 106 in the conference 400, and may maintain a level of uniformity or restrictions within the views 402, 404, 406 at the different endpoints 106.

Figure 4B:
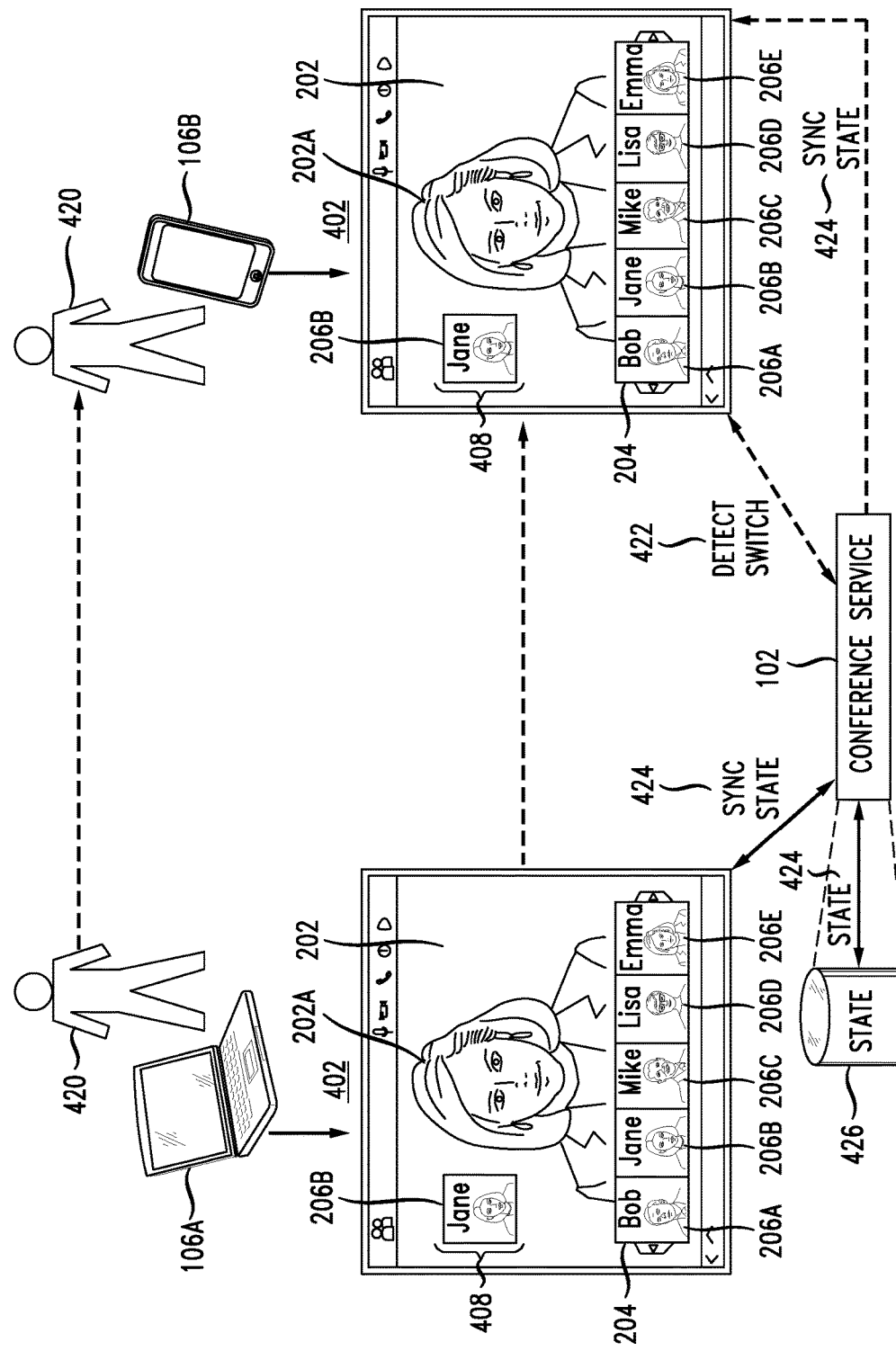
FIG. 4B illustrates an example system for maintaining conference settings for a participant across endpoints.

FIG. 4B illustrates an example system for maintaining conference settings for a participant across endpoints. In this example, participant 420 is connected to the conference from endpoint 106A. View 402 illustrates the conference interface presented at endpoint 106A to the participant 420.

As illustrated in view 402, the display region 202 is configured according to persistent state 408, and the panel 204 has a particular arrangement for participant 420.

The endpoint 106A and conference service 102 can synchronize the state 424 of view 402 at endpoint 106A. The endpoint 106A and conference service 102 can also synchronize other data, such as preferences, communications, content, etc. The conference service 102 can store the state 424 at a state storage 426, which can contain state information and other data from various participants, endpoints, and conferences.

The conference service 102 can associate the synchronized state 424 with participant 420, view 402, and/or endpoint 106A. If participant 420 switches from endpoint 106A to endpoint 106B during the conference (e.g., joins and continues the conference from endpoint 106B), the conference service 102 can detect the switch 422 and synchronize the state 424 with endpoint 106B. Endpoint 106B can then use the state 424 to present view 402 for participant 420 and retain any settings and configuration, including the persistent state 408, from view 402 at endpoint 106A. The participant 420 can thus maintain the experience throughout the conference even as the participant 420 changes devices. Thus, if the participant 420 selects to follow participant 206B from endpoint 106A, the participant 420 can continue to follow participant 206B from endpoint 106B when participant 420 joins the conference from endpoint 106B.

The synchronization of state and view 402 across endpoints 106A, 106B can be automated and/or seamless to participant 420. The conference service 102 can maintain the state of participant 420 updated and can monitor not only changes in state but also changes in devices. For example, the conference service 102 can monitor device switches based on notifications and/or communications received from endpoints, such as notifications that an endpoint has started or terminated a session in the conference. In some cases, the conference service 102 can also monitor device switches by sending or pinging devices to ensure such devices are active or otherwise remain in the conference. For example, the conference service 102 can send heartbeat messages to endpoints and timeout an endpoint when it fails to receive a response after a threshold number of messages sent.

When the participant 420 joins the conference via the endpoint 106B, the conference service 102 can associate the new session to the participant based on one or more factors. For example, when the endpoint 106B requests to join the conference it can identify the participant 420, which can allow the conference service 102 to detect the switch 422 between endpoints 106A, 106B. As another example, the conference service 102 can register specific endpoints to participant 420 and thus identify the switch 422 when it detects a request to join from endpoint 106B associated with participant 420. As yet another example, the conference service 102 may receive notification from endpoint 106A indicating that the participant 420 intends to switch to endpoint 106B or otherwise indicating that a session from endpoint 106B should be associated with the participant 420.

The conference service 102 can attribute a session from endpoint 106B to participant 420 based on one or more factors, such as a data included in a session or conference request received from endpoint 106B (e.g., username, email address, account identifier, user information, a code, etc.), the identity of the endpoint 106B (e.g., device identifier, etc.), address information associated with endpoint 106B (e.g., network address), meeting information, etc. When the conference service 102 attributes the session from endpoint 106B to the participant 420, it can determine that the switch 422 has occurred.

The conference service 102 can also retain state for a participant across different conferences. For example, participant 420 joins conference A and configures the conference interface according to view 402. Participant 420 then joins conference B, either from the same client device or a different client device. The conference service 102 can determine that the participant 420 has joined conference B and propagate state data from conference A to the device used by participant 420 to join conference B. This can enable the user's device to update the conference view for conference B according to view 402 from conference A, persistent state 408 from conference A, panel 204 from conference A, and/or any applicable setting from conference A. Thus, for example, if participant 420 follows participant 206B in conference A by moving participant 206B to a persistent location in view 402, the participant 420 can automatically continue to follow participant 206B when joining conference B which includes participant 206B.

Figure 5A:
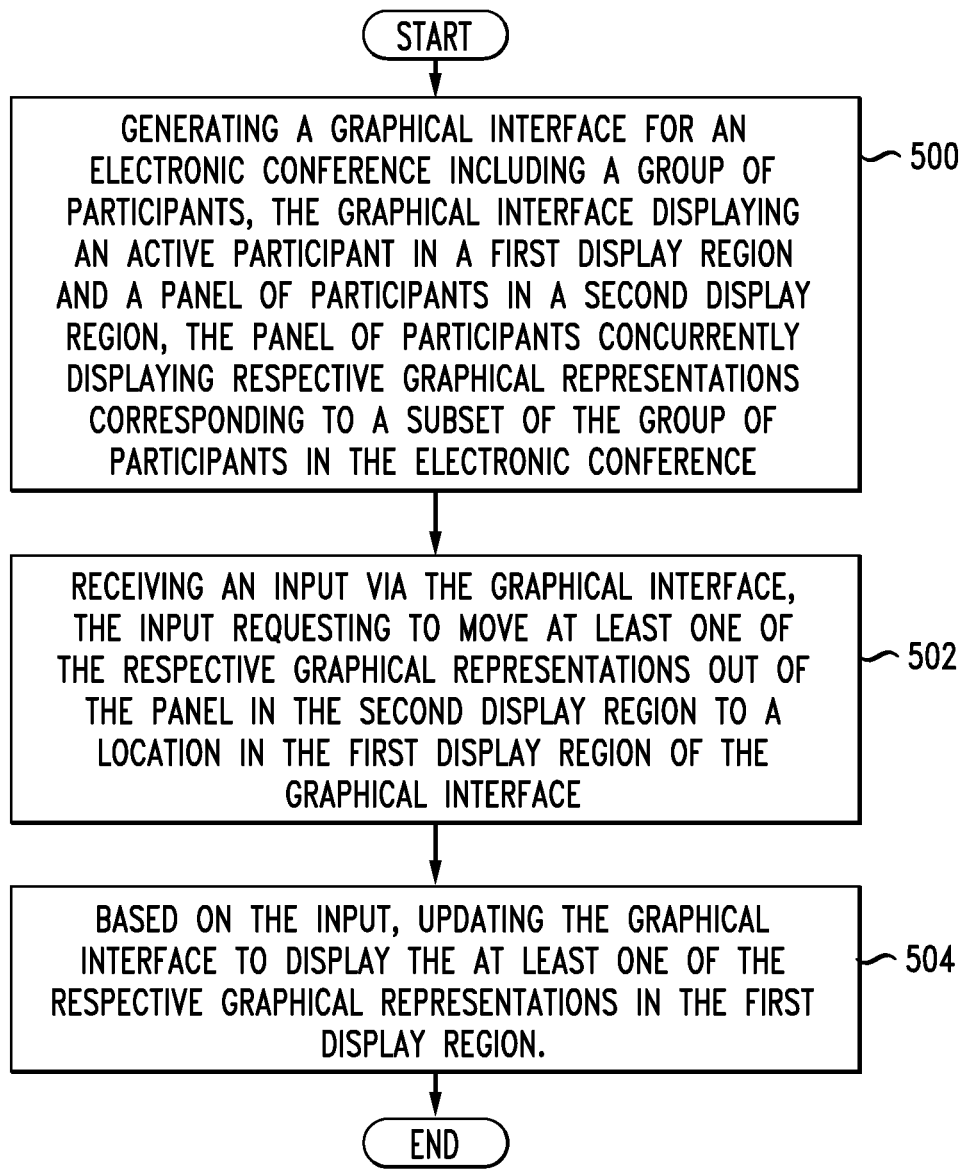
FIGS. 5A-B illustrate example method embodiments.
Figure 5B:
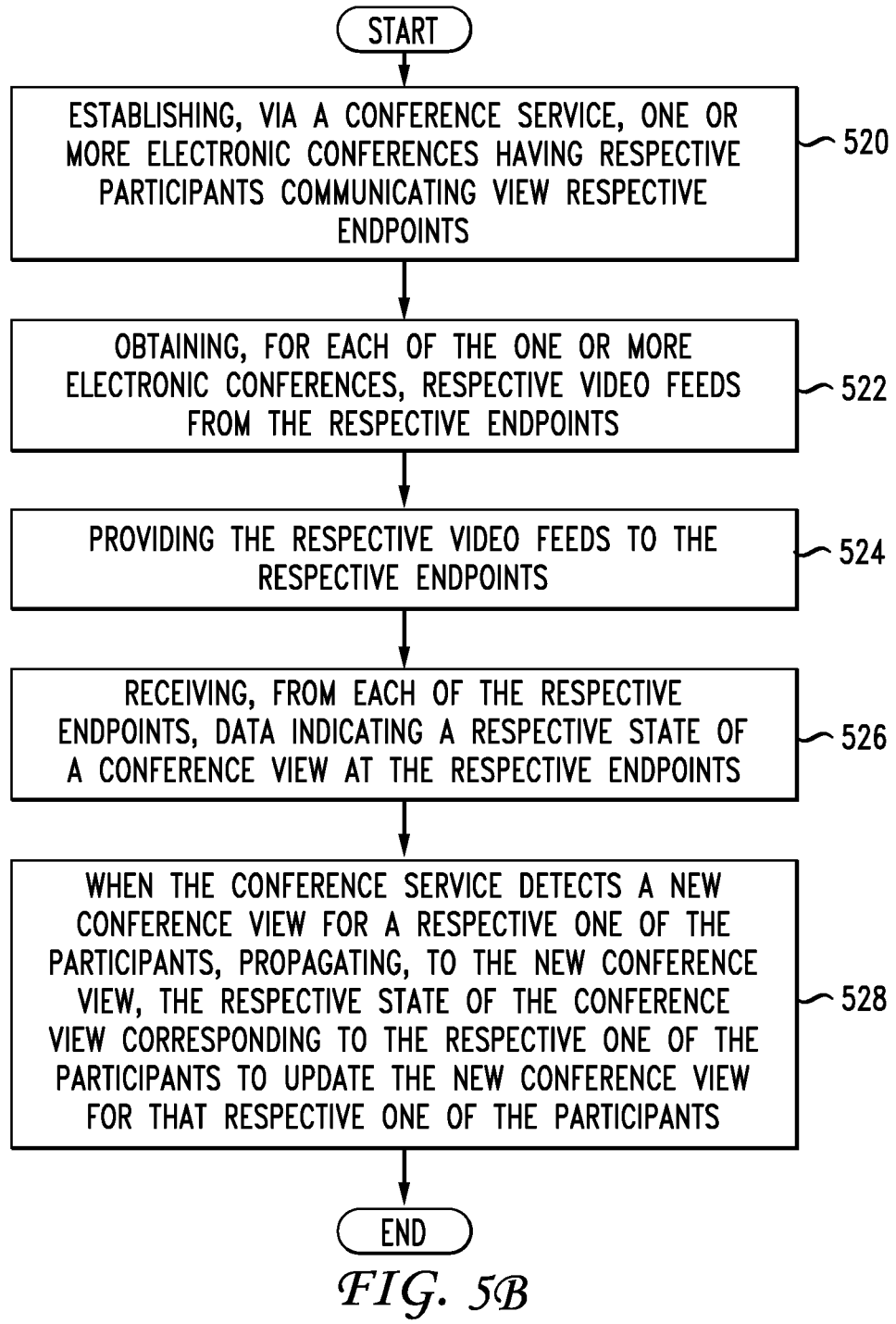

Having disclosed some basic system components and concepts, the disclosure now turns to the example methods shown in FIGS. 5A-B. The steps outlined herein are exemplary and can be implemented in any combination thereof, including combinations that exclude, add, or modify certain steps.

At step 500, the method can involve generating a graphical interface for an electronic conference including a group of participants, the graphical interface displaying an active participant (e.g., active participant 202A) in a first display region (e.g., display region 202) and a panel of participants (e.g., panel 204) in a second display region, the panel of participants concurrently displaying respective graphical representations corresponding to a subset of the group of participants in the electronic conference.

The electronic conference can include voice, video, instant message, chat, presence, etc. The graphical representations can include video and image feeds, as previously explained. Moreover, the graphical representations can be displayed in the panel as thumbnails, icons, feeds, channels, windows, etc.

The number of participants in the subset of the group of participants can be based a size restriction of the graphical interface and/or panel. For example, the size restriction can be based on a size of the graphical interface and/or a width of the panel, which may limit the number of participants that can be concurrently displayed in the panel. To illustrate, the width of the panel can be less than a combined width of a total number of respective graphical representations available in the electronic conference for the group of participants. Thus, one or more graphical representations may not fit concurrently within the panel and may thus have to be stacked and/or excluded from the visible portion of the panel. In some cases, the panel may allow scrolling to access graphical representations that are out of view. The number of graphical representations stacked or excluded can increase as the number of participants in a conference increases.

At step 502, the method can involve receiving an input via the graphical interface, the input requesting to move at least one of the respective graphical representations out of the panel in the second display region to a location in the first display region of the graphical interface, and at step 504, based on the input, updating the graphical interface to display the at least one of the respective graphical representations in the first display region. The location in the first display region can be a persistent location, such as persistent location 302A in display region 202, as previously explained.

The graphical representations displayed in the panel can change dynamically based on conference activity or conference adjustments, such as changes to active speaker roles, and/or user input such as user scrolling, stacking, or rearrangements. However, the graphical representations moved outside of the panel to the location within the first graphical display region may remain persistently displayed even if changes are made in the panel. In some cases, the graphical representations moved for display in a persistent location can remain in display until or unless a triggering event occurs, such as a user input request to move the graphical representations out of the persistent location or back into the panel.

The graphical representations can be moved by the user out of the location and/or first graphical display region and back into the panel. The user can also replace a graphical representation displayed in the location outside of the panel with another graphical representation in the panel. For example, if the user decides to follow a different participant, the user can replace which participant is displayed in the location outside of the panel. The user can also move additional graphical representations or objects to persistent locations in the first graphical display region, as previously explained. The state of the graphical interface can be stored and/or reported to other devices, as will be further explained below.

FIG. 5B illustrates another method embodiment for customizing participant conference views and synchronizing conference state. At step 520, a conference service (e.g., conference service 102) can establish one or more electronic conferences having respective participants communicating view respective endpoints (e.g., endpoints 106). The conferences can include, for example, video conferences hosted by the conference service 102, with each of the participants connecting to the conference from their respective endpoints 106 via one or more networks (e.g., network 120). The participants can connect to the conference from any geographic location. For example, some participants may connect from different geographic locations and/or networks. The participants can participate in the conference using the capabilities available at the respective endpoints 106, as well as any capabilities provisioned or supported by the conference service 102.

The participants can connect to the conferences via a conferencing application, such as conferencing application 112 illustrated in FIG. 1, which can include a web browser, browser-based conferencing software, or specific client conferencing application(s). In some cases, the participants can connect via a specific conferencing application associated with the conference and/or conference service 102. However, in some examples, the participants may connect via different platforms and/or conferencing applications or conferencing endpoint setups. For example, some participants may connect via the web browser while others may connect via one or more specific client conferencing applications.

In some examples, the conferences can be established by the conference service 102 according to the conference environment 100 illustrated in FIG. 1. Moreover, as described above with respect to FIG. 1, a conference can include voice, video, voice messaging, instant messaging, real-time presence information, chats, conferencing and/or telepresence capabilities, desktop sharing, etc.

The number of participants in a conference can vary or remain consistent throughout the conference. For example, the number of participants may change as some participants join and others leave at different points in the conference. Moreover, the size of the conference can vary based on the number of participants in the conference. As previously explained, the conference service 102 may support conferences with 10 s, 100 s or 1000 s of participants. Thus, the number of participants in the conference can be anywhere from a few participants to thousands of participants.

At step 522, the conference service 102 can obtain, for each of the one or more electronic conferences, respective video feeds from the respective endpoints 106 and, at step 524, provide the respective video feeds to the respective endpoints 106.

At step 526, the conference service 102 can receive, from each of the respective endpoints 106, data indicating a respective state of a conference view (e.g., 402, 404, 406) at the respective endpoints 106. The respective state can identify one or more video feeds that were moved in the conference view from a panel which concurrently displays a subset of the respective video feeds. For example, the respective state can identify one or more video feeds that were moved from the panel 204 to a persistent location in the first graphical display region (e.g., 202) of the conference view.

At step 528, when the conference service 102 detects a new conference view for a respective one of the participants, the conference service 102 can propagate, to the new conference view, the respective state of the conference view corresponding to the respective one of the participants to update the new conference view for that respective one of the participants. The number of video feeds in the subset of the respective video feeds can be based on a size restriction as previously explained.

The conference service 102 the new conference view for the respective one of the participants by determining that the respective one of the participants has joined an electronic conference from a different endpoint and/or joined a different electronic conference (either from the same or a different endpoint). In response, the conference service 102 can update the new conference view to display, in a respective persistent location outside of a respective panel which concurrently displays a second subset of video feeds, the one or more video feeds that were moved in the conference view from the panel to the persistent location outside of the panel. For example, the conference service 102 can synchronize state with the endpoint used by the particular participant for the new conference view in order to update the panel or display of the new conference view to display in a persistent location in the new conference view, any video feeds previously moved from the panel in the previous conference view to a persistent location.

The conference service 102 can synchronize, based on the respective state of the conference view, customized conference views of respective participants across endpoints 106 and/or electronic conferences or sessions. Since the conference service 102 can maintain state information for the respective endpoints 106, it can allow a participant to preserve a state of the respective conference interface to maintain the same configuration of the respective conference interface across different devices, sessions, and/or conferences. For example, the respective endpoints 106 and conference service 102 can synchronize state information. If a participant switches devices during the conference, the conference service 102 can push the respective state information associated with that participant to allow the participant to maintain the configuration and experience from the previous device at the new device.

For example, assume participant A joins a conference from endpoint 106A, and follows participant B in the conference by moving the participant representation of participant B outside of the panel to the graphical display region of the respective conference interface of participant A. The endpoint 106A would then present the updated conference interface for participant A, and the conference service 102 would store the state of the updated conference interface of participant A. The current state would indicate that participant A has selected to follow participant B. Assume that participant A later switches devices by joining or resuming the conference from endpoint 106B. The conference service 102 can detect that participant A has switched from endpoint 106A to endpoint 106B, and push the state information associated with participant A to endpoint B, in order to update or configure the conference interface for participant A at the endpoint 106B. Endpoint 106B can then display the conference interface to participant A, with participant B displayed outside of the panel in the graphical display region of conference interface presented at endpoint 106B. As a result, participant A can continue to follow participant B even as participant A switches devices. The state information pushed from the conference service 102 can also allow the conference interface at endpoint 106B to retain other settings and state from endpoint 106A, such as an arrangement of the panel, an object presented in the graphical display region, and/or other participants followed by participant A.

The conference service 102 can also push the respective state information in other sessions or conferences to allow a participant to retain certain configurations and settings across different sessions or conferences. For example, assume participant A follows participant B in a conference by moving the participant representation of participant B outside of the panel to the graphical display region of the respective conference interface of participant A. The endpoint used by participant A would then present the updated conference interface for participant A, and the conference service 102 would store the state of the updated conference interface of participant A. The current state would indicate that participant A has selected to follow participant B. Assume that participant A later joins a different conference that also includes participant B. Participant A may join the different conference from the same endpoint as before or a different endpoint. The conference service 102 can retrieve the state information stored from the previous conference, and send some or all of the state information to the endpoint used by participant A to connect to the different conference. The state information pushed by the conference service 102 can be used to update or configure at the endpoint of participant A the conference interface for the different conference, to allow participant A to continue following participant B in the new conference.

A persistent view of specific video feeds of interest during a conference can improve a participant's conference experience by allowing the participant to monitor the specific participants of interest, even in a large conference having numerous participants. As the number of participants in a conference increases, it would otherwise become increasingly difficult for the participant to keep track of specific participants within the conference. The amount of time that would otherwise be spent by the participant scrolling, navigating, or re-arranging the panel in an effort to track or monitor specific participants would be significantly wasteful and distracting, particularly in conferences with a large number of participants.

Each participant in a conference can move selected video feeds to a persistent location in a graphical display region outside of the panel, and/or re-arrange the panel as desired, to receive a customized experience via their respective conference interface. The conference service 102 can communicate with the respective endpoints 106 to obtain and/or exchange the state information for each respective conference interface. The conference service 102 may not synchronize all state information of a particular participant's view to all other participants at the respective endpoints 106, in order to allow each participant to receive a customized experience as opposed to a more rigid, uniform experience.

The conference view and the new conference view can display an active participant. As previously mentioned, an active participant can be a participant determined based on one or more factors, such as conference activity, and may change during the conference. For example, the active participant can be the active speaker in the conference. In some cases, the video feed of the active participant can be an enlarged, centered, focused, highlighted, maximized, and/or zoomed video feed, corresponding to the participant selected or identified as the active participant.

The conference service 102 can detect a new active participant in a conference based on activity in the conference and, based on the new active participant detected, update the respective conference view of participants in the conference to display the new active participant. In some cases, the active participant can dynamically change and replace a previous active participant in the conference view of participants. Such changes can by synchronized across the endpoints 106 in the conference. The conference service 102 can actively monitor, store, and synchronize activity and state information to inform the endpoints 106 of changes to the active participant, as well as any other changes that are to be propagated to all endpoints 106 connected to the conference.

The activity in the conference detected can trigger the update to the respective conference interface to display the graphical representation of the new active participant in the graphical display region. The activity can include, for example, voice or audio activity, video activity, user motion or presentation activity, etc. For example, the activity can be voice or audio activity, which would allow the active speaker to be prominently presented as the active participant in the graphical display region, and the respective conference interface to dynamically modify which graphical representation is displayed as the active participant in the graphical display region as the active speaker changes.

As another example, the activity can be motion or presentation activity, which would allow a participant performing a physical gesture for the conference (e.g., demonstrating a karate move in a self-defense conference) or presenting an object for the conference (e.g., showcasing a product for potential customers in a sales conference) to be prominently presented as the active participant in the graphical display region, and the respective conference interface to dynamically modify which graphical representation is displayed as the active participant in the graphical display region depending on which participant is performing or presenting visually to the conference.

The endpoints 106 and/or conference service 102 can be equipped with one or more sensors or devices for detecting activity which can trigger changes in which graphical representation is displayed as the active participant. Non-limiting examples of sensors or devices for detecting activity can include a camera, a microphone, a motion sensor, a speed sensor, a position sensor, a light sensor, a heat or temperature sensor, a touch sensor, an image sensor, a video sensor, a voice sensor, a biometric sensor, etc. Such sensors or devices can not only be used to detect certain activity but also detect noise or reduce false positive detections. For example, one or more microphones, cameras, sensors, and/or detection systems can be implemented to distinguish speech from background noise.

In some cases, the participants' views can be customized based on other factors, such as location. For example, if a number of participants are physically within a same location or threshold proximity where such participants may be able to see each other in-person, the active participant in their respective views main not change when one of those participants becomes an active participant in the conference. Since those participants are within range of the new active participant to see that new active participant in person, the conference service 102 may not update their respective conference views to display as the new active participant as the active participant in their conference views. Instead, their conference views may retain the previous active participant, as those participants can see the new participant in-person.

For this functionality, the endpoints 106 and/or conference service 102 may collect or capture location information for participants to determine if any participants are within view of each other. In some cases, the participants can also provide input indicating their location and/or that they are with other participants.

The disclosure now turns to FIGS. 6 and 7A-B, which illustrate example devices.

FIG. 6 illustrates an example network device 600 suitable for performing switching, routing, bridging, and networking operations. Network device 600 includes a master central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608 such as a processor from the Motorola family of microprocessors or the MIPS family of microprocessors. In an alternative embodiment, processor 608 is specially designed hardware for controlling the operations of network device 600. In a specific embodiment, a memory 606 (such as non-volatile RAM, a TCAM, and/or ROM) also forms part of CPU 604. However, there are many different ways in which memory could be coupled to the system.

The interfaces 602 are typically provided as interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 604 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 7A and FIG. 7B illustrate example system embodiments. The more appropriate embodiment will be apparent to those of ordinary skill in the art when practicing the present technology. Persons of ordinary skill in the art will also readily appreciate that other system embodiments are possible.

FIG. 7A illustrates a system bus computing system architecture 700 wherein the components of the system are in electrical communication with each other using a bus 706. Exemplary system 700 includes a processing unit (CPU or processor) 704 and a system bus 706 that couples various system components including the system memory 720, such as read only memory (ROM) 718 and random access memory (RAM) 716, to the processor 704. The system 700 can include a cache of high-speed memory connected directly with, in close proximity to, or integrated as part of the processor 704. The system 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions. Other system memory 720 may be available for use as well. The memory 720 can include multiple different types of memory with different performance characteristics. The processor 704 can include any general purpose processor and a hardware module or software module, such as module 1 710, module 2 712, and module 3 714 stored in storage device 708, configured to control the processor 704 as well as a special-purpose processor where software instructions are incorporated into the actual processor design. The processor 704 may essentially be a completely self-contained computing system, containing multiple cores or processors, a bus, memory controller, cache, etc. A multi-core processor may be symmetric or asymmetric.

To enable user interaction with the computing device 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing device 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 716, read only memory (ROM) 718, and hybrids thereof.

The storage device 708 can include software modules 710, 712, 714 for controlling the processor 704. Other hardware or software modules are contemplated. The storage device 708 can be connected to the system bus 706. In one aspect, a hardware module that performs a particular function can include the software component stored in a computer-readable medium in connection with the necessary hardware components, such as the processor 704, bus 706, output device 724, and so forth, to carry out the function.

The system 700 can also include an application-specific integrated circuit (ASIC) 728. The ASIC 728 can communicate with other components via the bus 706. The ASIC 728 can be configured with logic for performing specific operations, and processing specific data.

FIG. 7B illustrates an example computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 752, representative of any number of physically and/or logically distinct resources capable of executing software, firmware, and hardware configured to perform identified computations. Processor 752 can communicate with a chipset 764 that can control input to and output from processor 752. In this example, chipset 764 outputs information to output 762, such as a display, and can read and write information to storage device 764, which can include magnetic media, and solid state media, for example. Chipset 764 can also read data from and write data to RAM 777. A bridge 756 for interfacing with a variety of user interface components 758 can be provided for interfacing with chipset 560. Such user interface components 758 can include a keyboard, a microphone, touch detection and processing circuitry, a pointing device, such as a mouse, and so on. In general, inputs to system 750 can come from any of a variety of sources, machine generated and/or human generated.

Chipset 764 can also interface with one or more communication interfaces 760 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 752 analyzing data stored in storage 764 or 777. Further, the machine can receive inputs from a user via user interface components 758 and execute appropriate functions, such as browsing functions by interpreting these inputs using processor 752.

It can be appreciated that example systems 700 and 750 can have more than one processor or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    generating a graphical interface for an electronic conference comprising a group of participants, the graphical interface displaying an active participant in a first display region and a panel of respective graphical participant representations in a second display region, the panel having a length based on a number of the graphical participant representations;
    receiving an input via the graphical interface, the input requesting to move at least one of the respective graphical participant representations out of the panel in the second display region to a location in the first display region of the graphical interface thereby reducing the length of the panel; and
    based on the input, updating the graphical interface to display the at least one of the respective graphical participant representations in the first display region and to remove the at least one of the graphical participant representations from the panel;
    wherein when the panel length is longer than the second display region only a portion of the panel is displayable in the second display region, and the panel is moveable to adjust the portion; and
    wherein when the panel is moved, the movement does not affect a position of the at least one of the graphical participant representations that was removed from the second display region and is being displayed in the first display region.

2. The method of claim 1, wherein the panel concurrently displays the respective graphical participant representations, and wherein the respective graphical participant representations correspond to a subset of the group of participants in the electronic conference.

3. The method of claim 2, wherein a number of participants in the subset of the group of participants is based a size restriction of the panel, wherein the size restriction is based on at least one of a size of the graphical interface and a width of the panel.

4. The method of claim 1, wherein the panel concurrently displays respective graphical participant representations corresponding to a subset of the group of participants in the electronic conference, wherein one or more of the respective graphical participant representations concurrently displayed in the panel are selected based on participant activity in the electronic conference, the method further comprising:
    based on the participant activity, dynamically changing at least one of a first respective graphical participant representation presented as the active participant or a second respective graphical participant representation from the respective graphical participant representations concurrently displayed in the panel.

5. The method of claim 1, wherein the location comprises a persistent location within the first graphical region and outside of the panel, and wherein updating the graphical interface comprises instructing the graphical interface to place the at least one of the respective graphical participant representations in the persistent location for persistent display within the first display region.

6. The method of claim 5, further comprising updating the graphical interface to remove the at least one of the respective graphical participant representations from the persistent location only in response to a user input request to remove the at least one of the respective graphical participant representations from at least one of the persistent location or the first display region.

7. The method of claim 1, wherein the electronic conference comprises at least one of voice, video, and messaging, and wherein the respective graphical participant representations comprise at least one of thumbnails, icons, image feeds, and video feeds.

8. The method of claim 1, further comprising:
in response to a second input via the graphical interface, updating the graphical interface to display a content item in a second location in the first display region, wherein the content item comprises at least one of a document, a media item, a software object, and a file.

9. The method of claim 1, further comprising:
receiving a second input via the graphical interface, the second input requesting to move a respective one of the at least one of the respective graphical participant representations out of the location in the first display region and back to the panel in the second display region;
based on the second input, updating the graphical interface to display the respective one of the at least one of the respective graphical participant representations in the panel; and
updating state data maintained for the graphical interface, the state data defining a state of the graphical interface, the state comprising at least one of a first configuration of the panel and a second configuration of the first display region.

10. A system comprising:
one or more processors; and
at least one computer-readable storage medium having stored therein instructions which, when executed by the one or more processors, cause the one or more processors to:
establish one or more electronic conferences comprising respective participants communicating via respective client devices;
for each of the one or more electronic conferences, obtain respective video feeds from the respective client devices;
for each of the one or more electronic conferences, provide the respective video feeds to the respective client devices;
receive, from each of the respective client devices, data indicating a respective state of a conference view at the respective client device, the respective state identifying one or more video feeds that were moved in the conference view from a panel displaying a subset of the respective video feeds to a primary display region; and
when the system detects a new conference view for a respective one of the participants, propagate, to the new conference view, the respective state of the conference view corresponding to the respective one of the participants to update the new conference view for that respective one of the participants.

11. The system of claim 10, wherein a number of video feeds in the subset of the respective video feeds is based on a size restriction associated with at least one of a size of the conference view and a width of the panel, wherein the width of the panel is less than a combined width of all of the respective video feeds.

12. The system of claim 10, wherein detecting the new conference view for the respective one of the participants comprises determining that the respective one of the participants has joined an electronic conference from a different client device or joined a different electronic conference, and wherein propagating the respective state to update the new conference view comprises updating the new conference view to display, in a respective persistent location outside of a respective panel which concurrently displays a second subset of video feeds, the one or more video feeds that were moved in the conference view from the panel to the persistent location outside of the panel.

13. The system of claim 10, the at least one computer-readable storage medium storing additional instructions which, when executed by the one or more processors, cause the one or more processors to:
based on the respective state of the conference view, synchronizing customized conference views of respective participants across at least one of different client devices and different electronic conferences.

14. A non-transitory computer-readable storage medium comprising:
instructions stored therein which, when executed by one or more processors, cause the one or more processors to:
generate a graphical interface for an electronic conference comprising a group of participants, the graphical interface displaying an active participant in a first display region and a panel of respective graphical participant representations in a second display region, the panel having a length based on a number of the graphical participant representations;
receive an input via the graphical interface, the input requesting to move at least one of the respective graphical participant representations out of the panel in the second display region to a location in the first display region of the graphical interface thereby reducing the length of the panel; and
based on the input, update the graphical interface to display the at least one of the respective graphical participant representations in the first display region and to remove the at least one of the graphical participant representations from the panel;
wherein when the panel length is longer than the second display region only a portion of the panel is displayable in the second display region, and the panel is moveable to adjust the portion; and
wherein when the panel is moved, the movement does not affect a position of the at least one of the graphical participant representations that was removed from the second display region and is being displayed in the first display region.

15. The non-transitory computer-readable storage medium of claim 14, wherein the panel concurrently displays the respective graphical participant representations, the respective graphical participant representations corresponding to a subset of the group of participants in the electronic conference.

16. The non-transitory computer-readable storage medium of claim 14, wherein a number of participants in the subset of the group of participants is based a size restriction of the panel, wherein the size restriction is based on at least one of a size of the graphical interface and a width of the panel, and wherein the width of the panel is less than a combined width of a total number of respective graphical participant representations available in the electronic conference for the group of participants.

17. The non-transitory computer-readable storage medium of claim 14, wherein one or more of the respective graphical participant representations are selected based on participant activity in the electronic conference, and wherein the non-transitory computer-readable storage medium stores additional instructions which, when executed by the one or more processors, cause the one or more processors to:

based on the participant activity, dynamically changing at least one of a first respective graphical participant representation presented as the active participant or a second respective graphical participant representation from the respective graphical participant representations.

18. The non-transitory computer-readable storage medium of claim 14, wherein the location comprises a persistent location within the first graphical region and outside of the panel, and wherein updating the graphical interface comprises instructing the graphical interface to place the at least one of the respective graphical participant representations in the persistent location for persistent display within the first display region.

19. The non-transitory computer-readable storage medium of claim 18, wherein the electronic conference comprises at least one of voice, video, and messaging, and wherein the respective graphical participant representations comprise video feeds, the non-transitory computer-readable storage medium storing additional instructions which, when executed by the one or more processors, cause the one or more processors to:

lock the at least one of the respective graphical participant representations at the persistent location for display in the first display region for a remainder of the electronic conference.

20. A system comprising:
one or more processors; and
at least one computer-readable medium having stored therein instructions which, when executed by the one or more processors, cause the system to:
generate a graphical interface for an electronic conference comprising a group of participants, the graphical interface displaying an active participant in a first display region and a panel of respective graphical participant representations in a second display region, the panel having a length based on a number of the graphical participant representations;
receive an input via the graphical interface, the input requesting to move at least one of the respective graphical participant representations out of the panel in the second display region to a location in the first display region of the graphical interface thereby reducing the length of the panel; and
based on the input, update the graphical interface to display the at least one of the respective graphical participant representations in the first display region and to remove the at least one of the graphical participant representations from the panel;
wherein when the panel length is longer than the second display region only a portion of the panel is displayable in the second display region, and the panel is moveable to adjust the portion; and
wherein when the panel is moved, the movement does not affect a position of the at least one of the graphical participant representations that was removed from the second display region and is being displayed in the first display region.

21. A method comprising:
establishing one or more electronic conferences comprising respective participants communicating via respective client devices;
for each of the one or more electronic conferences, obtaining respective video feeds from the respective client devices;
for each of the one or more electronic conferences, providing the respective video feeds to the respective client devices;
receiving, from each of the respective client devices, data indicating a respective state of a conference view at the respective client device, the respective state identifying one or more video feeds that were moved in the conference view from a panel displaying a subset of the respective video feeds to a primary display region; and
in response to detecting a new conference view for a respective one of the participants, propagating, to the new conference view, the respective state of the conference view corresponding to the respective one of the participants to update the new conference view for that respective one of the participants.

22. The method of claim 21, wherein a number of video feeds in the subset of the respective video feeds is based on a size restriction associated with at least one of a size of the conference view and a width of the panel, wherein the width of the panel is less than a combined width of all of the respective video feeds.

23. A non-transitory computer-readable storage medium comprising:
instructions stored thereon which, when executed by one or more processors, cause the one or more processors to:
establish one or more electronic conferences comprising respective participants communicating via respective client devices;
for each of the one or more electronic conferences, obtain respective video feeds from the respective client devices;
for each of the one or more electronic conferences, provide the respective video feeds to the respective client devices;
receive, from each of the respective client devices, data indicating a respective state of a conference view at the respective client device, the respective state identifying one or more video feeds that were moved in the conference view from a panel displaying a subset of the respective video feeds to a primary display region; and
when the system detects a new conference view for a respective one of the participants, synchronize, to the new conference view, the respective state of the conference view corresponding to the respective one of the participants to update the new conference view for that respective one of the participants.

24. The method of claim 1, wherein a position of the active participant in the first display region remains the same in response to the updating.

25. The media of claim 14, wherein a position of the active participant in the first display region the updating remains the same in response to the update.

26. The system of claim 20, wherein a position of the active participant in the first display region the updating remains the same in response to the update.

* * * * *